United States Patent
Pryor et al.

(10) Patent No.: US 10,208,656 B2
(45) Date of Patent: Feb. 19, 2019

(54) COMPOSITE SUPERCHARGER ROTORS AND METHODS OF CONSTRUCTION THEREOF

(71) Applicant: EATON INTELLIGENT POWER LIMITED, Dublin (IE)

(72) Inventors: Martin Dale Pryor, Canton, MI (US); William Nicholas Eybergen, Harrison Township, MI (US)

(73) Assignee: Eaton Intelligent Power Limited, Dublin (IE)

( * ) Notice: Subject to any disclaimer, the term of this patent is extended or adjusted under 35 U.S.C. 154(b) by 277 days.

(21) Appl. No.: 14/717,654

(22) Filed: May 20, 2015

(65) Prior Publication Data

US 2015/0252719 A1 Sep. 10, 2015

Related U.S. Application Data

(63) Continuation of application No. PCT/US2013/070995, filed on Nov. 20, 2013.
(Continued)

(51) Int. Cl.
*F01C 1/16* (2006.01)
*F02B 33/38* (2006.01)
(Continued)

(52) U.S. Cl.
CPC .............. *F02B 33/38* (2013.01); *F01C 21/08* (2013.01); *F04C 18/084* (2013.01); *F04C 18/16* (2013.01);
(Continued)

(58) Field of Classification Search
CPC ...... F04C 18/084; F04C 18/123; F04C 18/16; F04C 2240/20; F05C 2253/04
(Continued)

(56) References Cited

U.S. PATENT DOCUMENTS

| 885,109 A | 4/1908 | Truss |
| 1,304,102 A | 5/1919 | Routledge |

(Continued)

FOREIGN PATENT DOCUMENTS

| CH | 343 712 A | 12/1959 |
| CN | 101311537 A | 11/2008 |

(Continued)

OTHER PUBLICATIONS

International Search Report for corresponding International Patent Application No. PCT/US2013/070995 dated Mar. 6, 2014.
(Continued)

*Primary Examiner* — Audrey K Bradley
*Assistant Examiner* — Anthony Ayala Delgado
(74) *Attorney, Agent, or Firm* — Merchant & Gould P.C.

(57) ABSTRACT

A supercharger rotor with reduced rotational inertia may result in increased performance of a supercharger. The rotor may include composite material and may be extrusion molded, injection molded, or otherwise molded or laid-up. In certain embodiments, the rotor may include a core with a central portion and one or more radially extending portions. The core may be extruded or formed of stacked sheets. A molded portion of the rotor, including one or more lobes, may be molded over a corresponding one of the radially extending portions. In other embodiments, a main portion of the rotor includes one or more lobes but no central hole nor a corresponding shaft extending between ends of the main portion. Instead, stub shafts are attached to the ends of the main portion. The increased performance may include decreased noise, decreased cost, increased reliability and/or durability, increased thermal efficiency, an increased power-to-weight ratio, etc.

20 Claims, 14 Drawing Sheets

Related U.S. Application Data

(60) Provisional application No. 61/728,399, filed on Nov. 20, 2012.

(51) Int. Cl.
*F04C 18/16* (2006.01)
*F01C 21/08* (2006.01)
*F04C 18/08* (2006.01)
*F04C 18/12* (2006.01)

(52) U.S. Cl.
CPC ........ *F04C 18/123* (2013.01); *F04C 2230/21* (2013.01); *F04C 2240/20* (2013.01); *F05C 2201/00* (2013.01); *F05C 2253/04* (2013.01)

(58) Field of Classification Search
USPC ...................................................... 418/206.1
See application file for complete search history.

(56) References Cited

U.S. PATENT DOCUMENTS

| | | | |
|---|---|---|---|
| 1,399,290 A | 12/1921 | Brulle | |
| 1,610,816 A | 12/1926 | Rutherford | |
| 2,139,748 A | 12/1938 | Harrell | |
| 2,304,067 A | 12/1942 | Anderson | |
| 2,325,617 A | 8/1943 | Lysholm et al. | |
| 2,362,106 A | 11/1944 | Ungar et al. | |
| 2,368,295 A | 1/1945 | Goran | |
| 2,483,024 A | 9/1949 | Roters | |
| 2,714,314 A | 8/1955 | Ulander | |
| 2,763,916 A | 9/1956 | Korski | |
| 3,175,277 A | 3/1965 | Brown et al. | |
| 3,490,143 A | 1/1970 | Hull | |
| 3,706,511 A | 12/1972 | Abbott | |
| 3,918,838 A | 11/1975 | Moody, Jr. et al. | |
| 4,015,154 A | 3/1977 | Tanaka et al. | |
| 4,272,579 A | 6/1981 | Mitsui | |
| 4,710,085 A | 12/1987 | Beakes et al. | |
| 4,761,124 A | 8/1988 | Timuska et al. | |
| 4,828,467 A | 5/1989 | Brown | |
| 5,011,389 A | 4/1991 | Timuska | |
| 5,165,881 A * | 11/1992 | Wicen .................... | F01C 21/08 264/274 |
| 5,290,150 A | 3/1994 | Takahashi et al. | |
| 5,310,320 A | 5/1994 | Timuska | |
| 5,349,740 A | 9/1994 | Neuenschwander | |
| 5,467,521 A | 11/1995 | Nakamura et al. | |
| 6,849,220 B1 | 2/2005 | Sundstrom et al. | |
| 7,488,164 B2 | 2/2009 | Swartlander | |
| 7,866,966 B2 | 1/2011 | Swartzlander | |
| 8,100,676 B2 | 1/2012 | Kjeldsen et al. | |
| 8,196,686 B2 | 6/2012 | Grieve | |
| 9,932,983 B2 | 4/2018 | Eybergen et al. | |
| 2006/0138894 A1 | 6/2006 | Harada et al. | |
| 2008/0080996 A1 | 4/2008 | Kataoka et al. | |
| 2008/0170958 A1* | 7/2008 | Prior ..................... | F04C 18/084 418/179 |
| 2008/0219877 A1 | 9/2008 | Kjeldsen et al. | |
| 2009/0016893 A1 | 1/2009 | Lee et al. | |
| 2009/0021105 A1 | 1/2009 | Evans | |
| 2009/0140598 A1 | 6/2009 | Schieweck et al. | |
| 2009/0146519 A1 | 6/2009 | Myojin | |
| 2012/0014823 A1 | 1/2012 | Riedl et al. | |
| 2013/0075526 A1 | 3/2013 | Griess et al. | |
| 2016/0003248 A1 | 1/2016 | Eybergen et al. | |
| 2017/0101989 A1 | 4/2017 | Eybergen et al. | |
| 2017/0130643 A1 | 5/2017 | Williams et al. | |
| 2017/0298733 A1 | 10/2017 | Williams et al. | |

FOREIGN PATENT DOCUMENTS

| | | |
|---|---|---|
| DE | 15 03 663 A1 | 6/1969 |
| DE | 23 08 195 A1 | 8/1974 |
| DE | 199 09 191 A1 | 9/2000 |
| EP | 0 477 601 A1 | 4/1992 |
| GB | 409 853 A | 5/1934 |
| GB | 740 050 A | 11/1955 |
| GB | 799 337 A | 8/1958 |
| GB | 1 306 352 A | 2/1973 |
| JP | 1-294985 A | 11/1989 |
| JP | H04-058093 A | 2/1992 |
| JP | H03-096684 A | 4/1992 |
| JP | 4-159482 A | 6/1992 |
| JP | H06-101671 A | 4/1994 |
| JP | 2003-184758 A | 7/2003 |
| JP | 2006-233816 A | 9/2006 |
| JP | 2011-112019 A | 6/2011 |
| WO | 01/28746 A1 | 4/2001 |
| WO | 2004/053296 A1 | 6/2004 |
| WO | 2013/130774 A1 | 9/2013 |
| WO | 2014/107407 A1 | 7/2014 |
| WO | WO 2014/151057 A2 | 9/2014 |
| WO | 2015/138557 A1 | 9/2015 |
| WO | 2015/184371 A1 | 12/2015 |
| WO | 2016/049514 A1 | 3/2016 |

OTHER PUBLICATIONS

International Search Report for International Patent Application No. PCT/US2014/024856 dated Oct. 23, 2014.

* cited by examiner

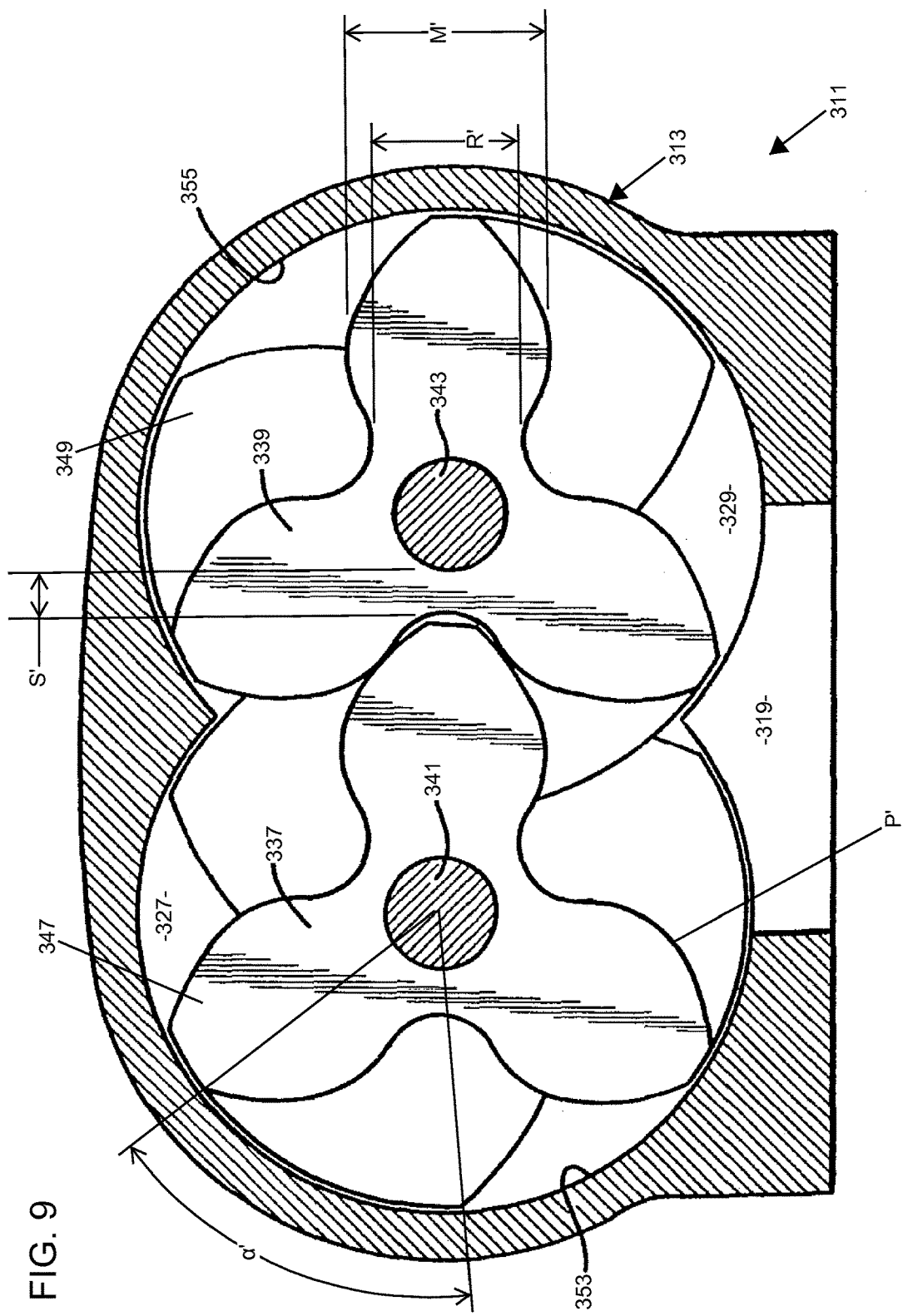

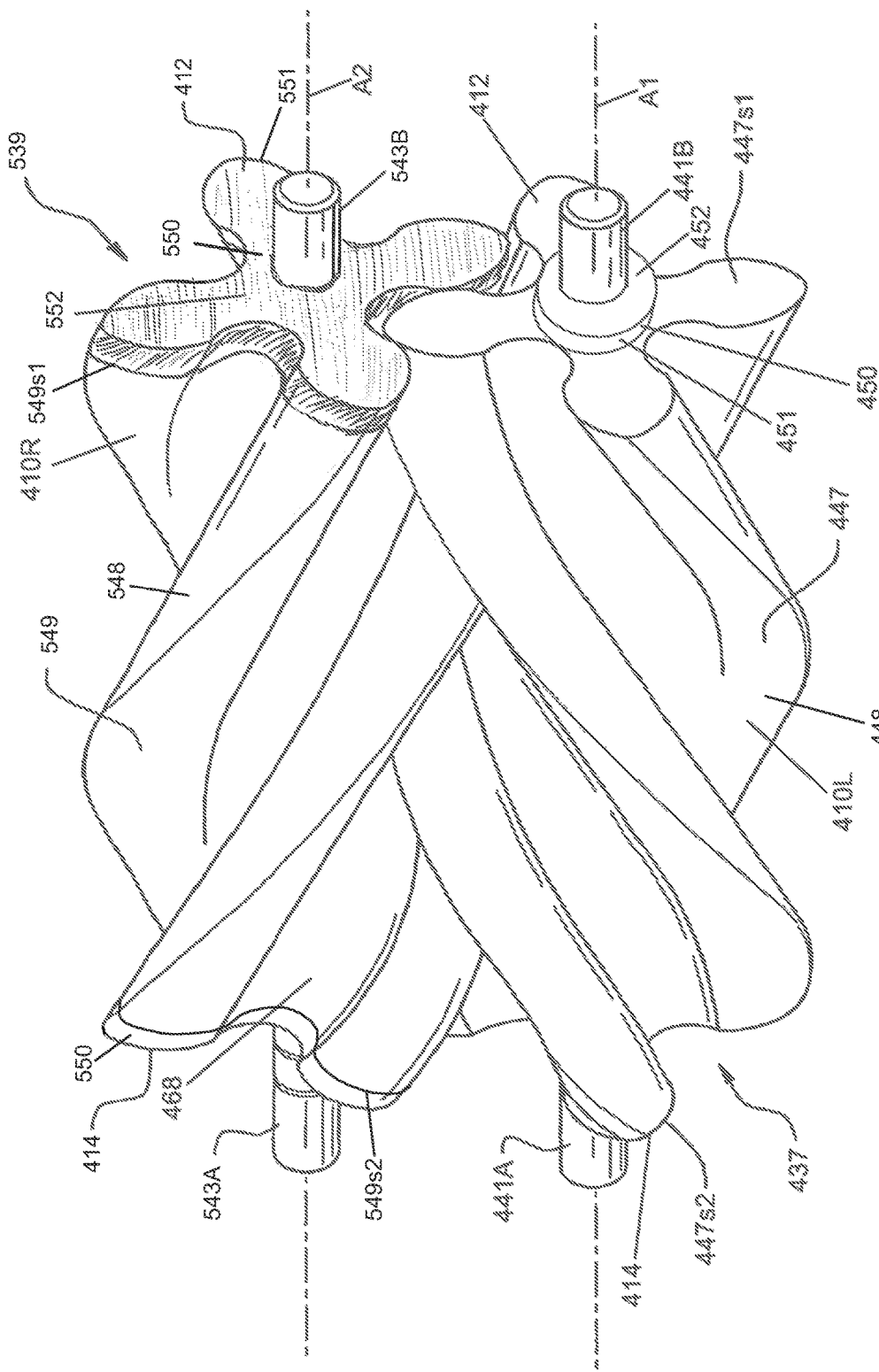

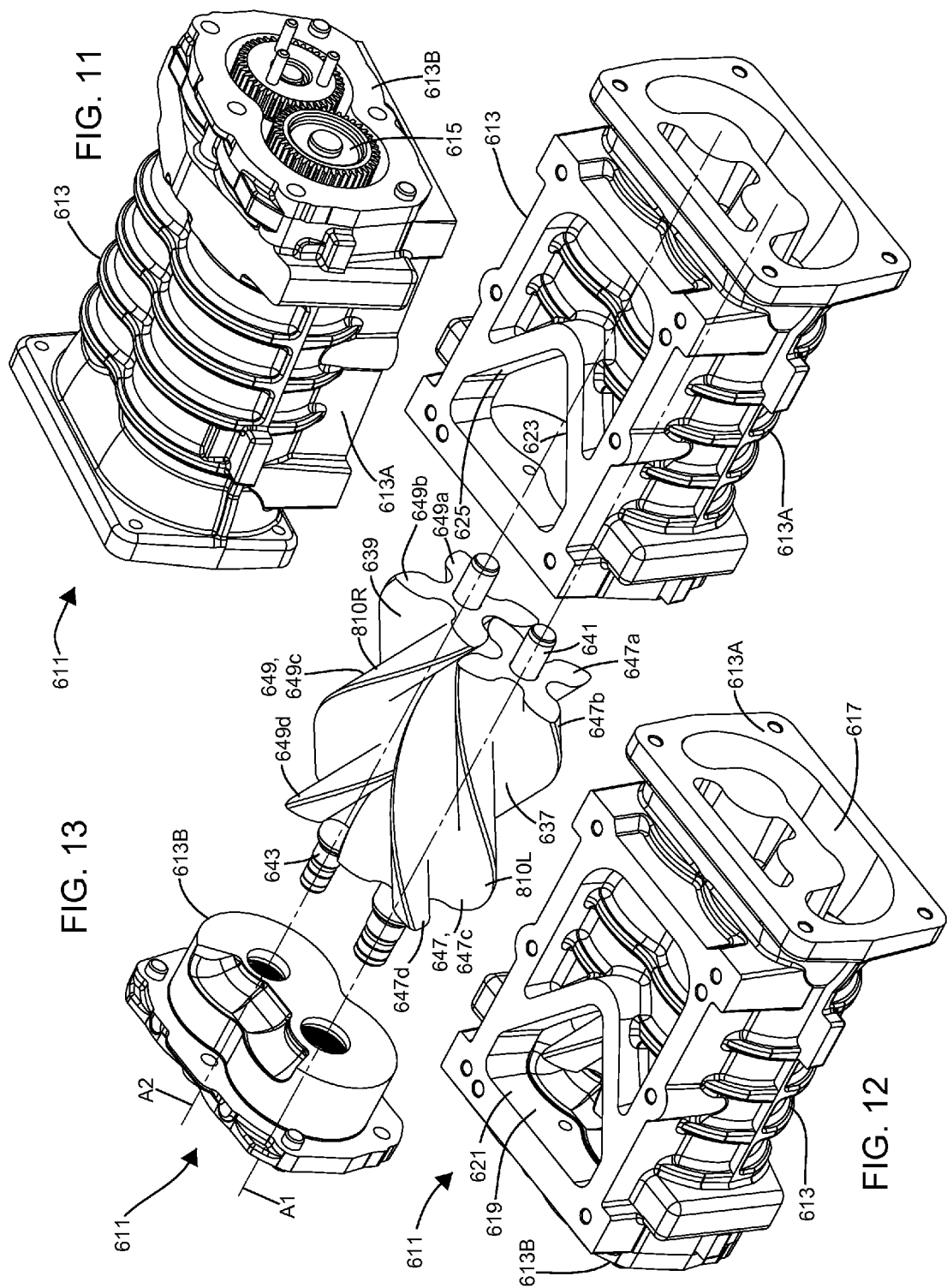

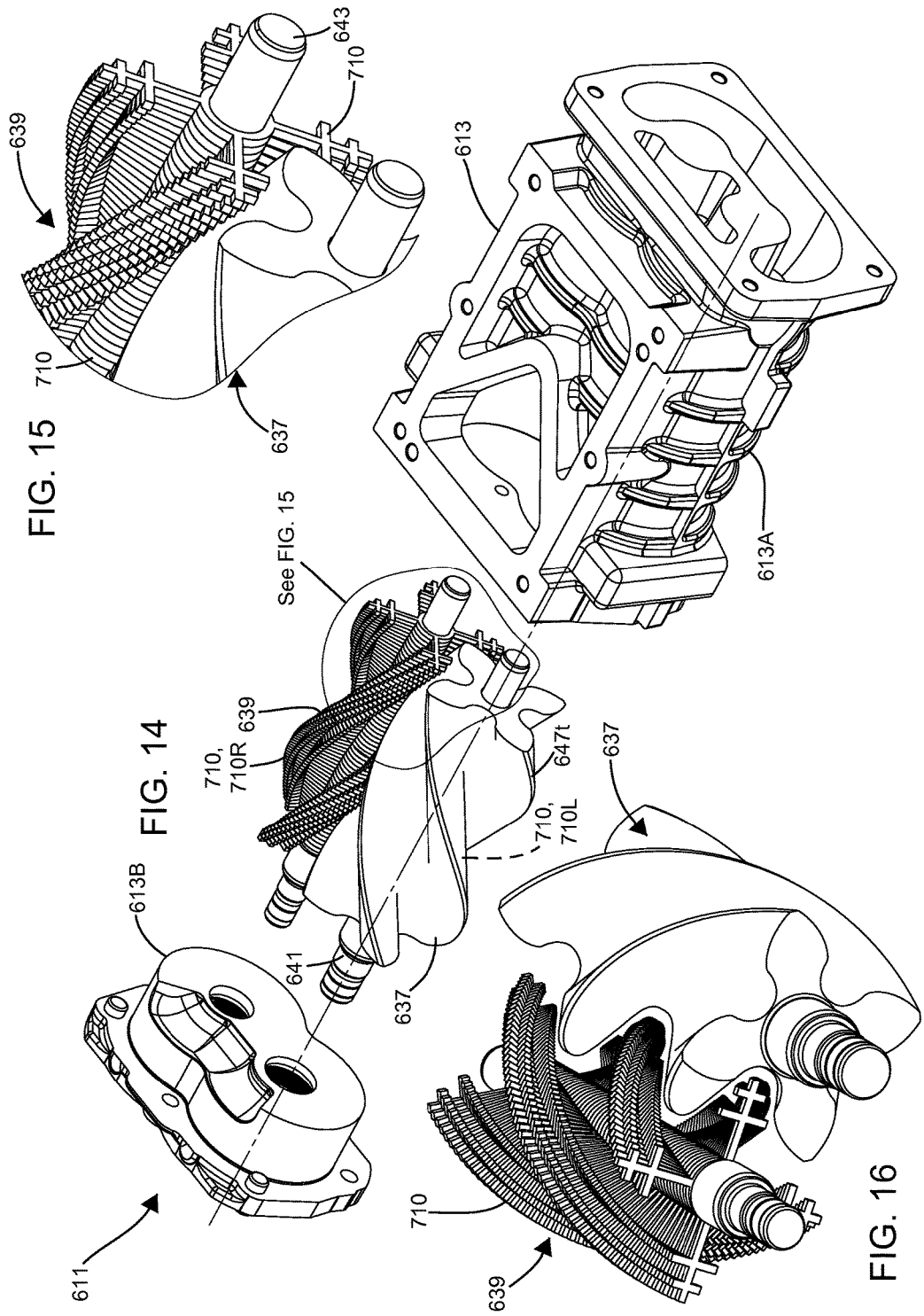

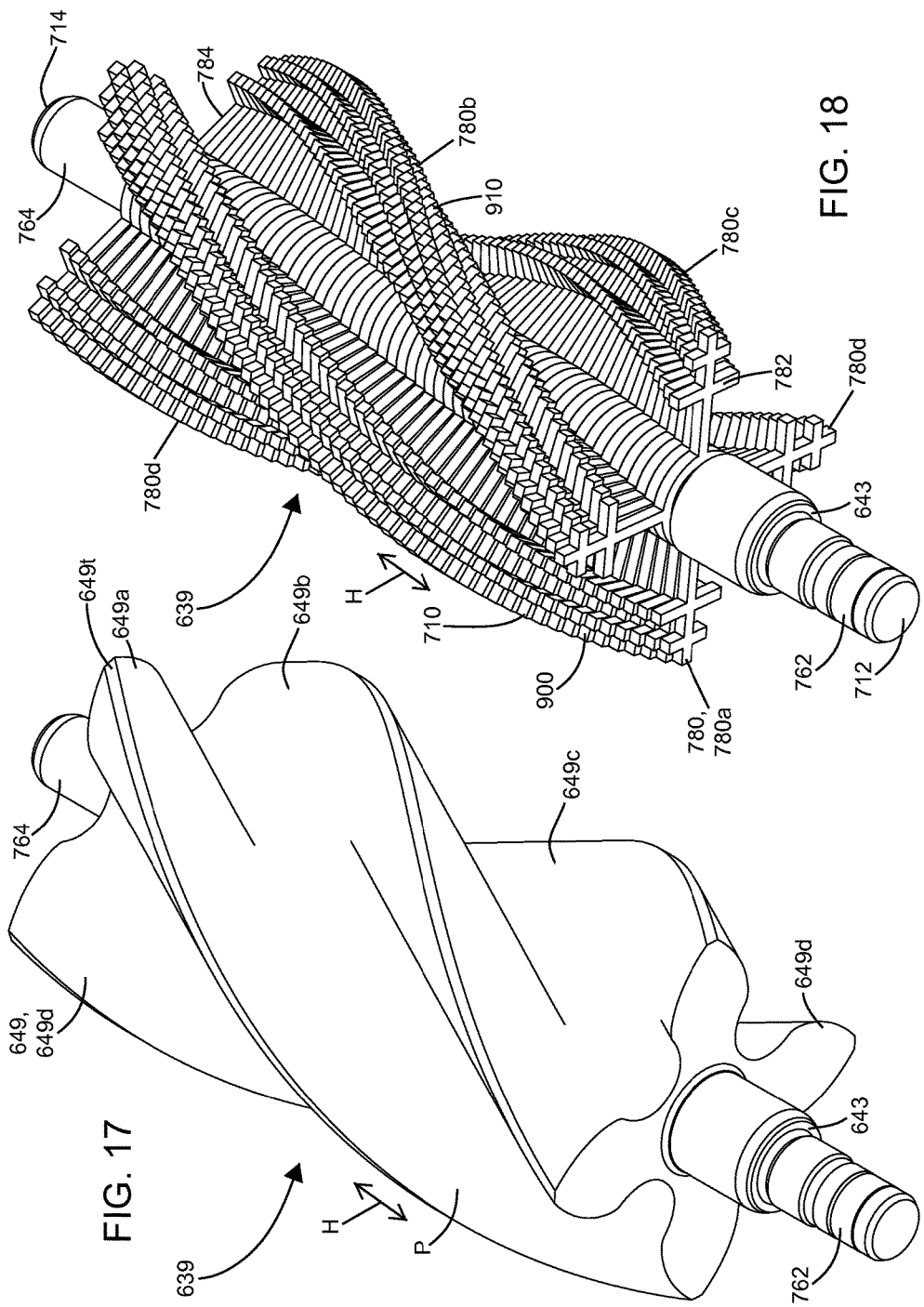

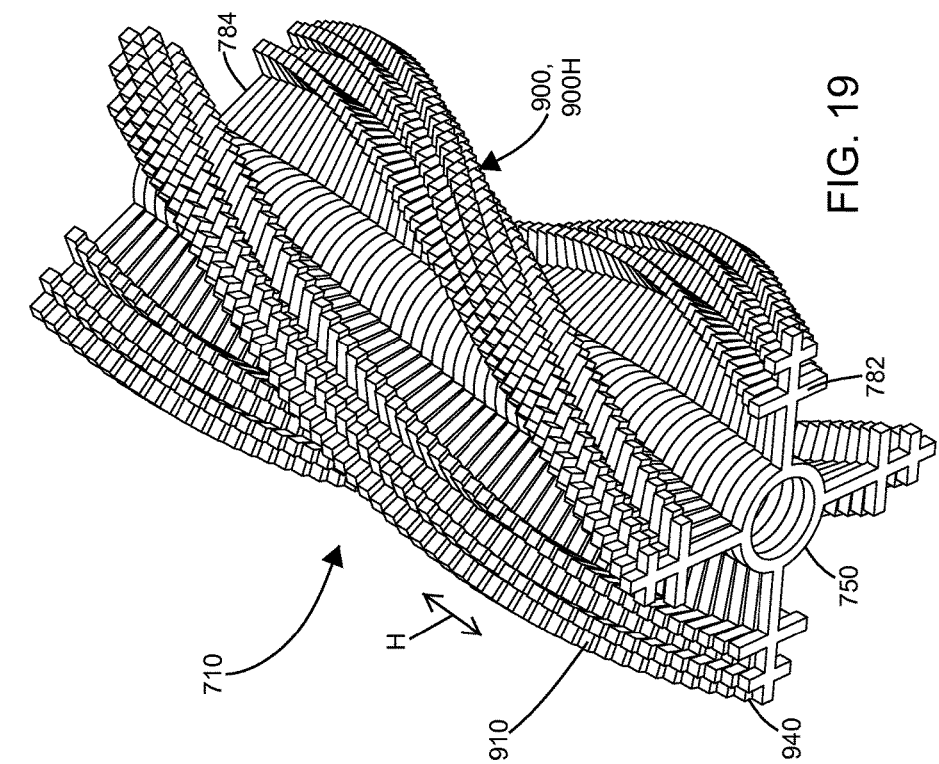
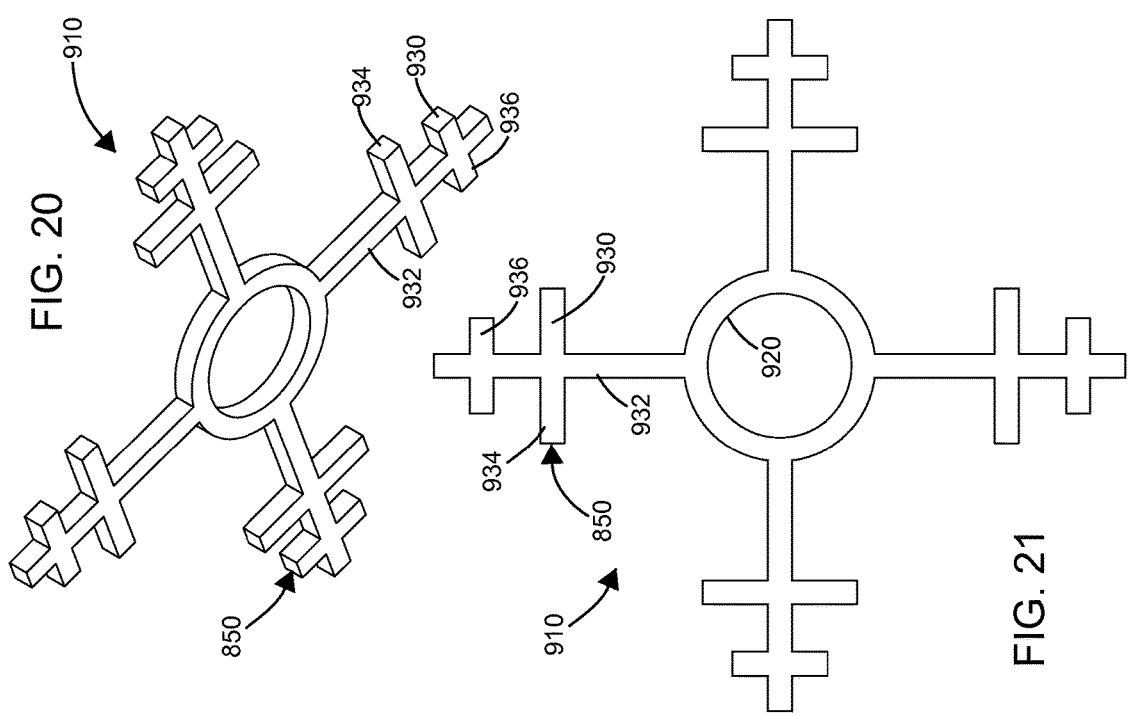

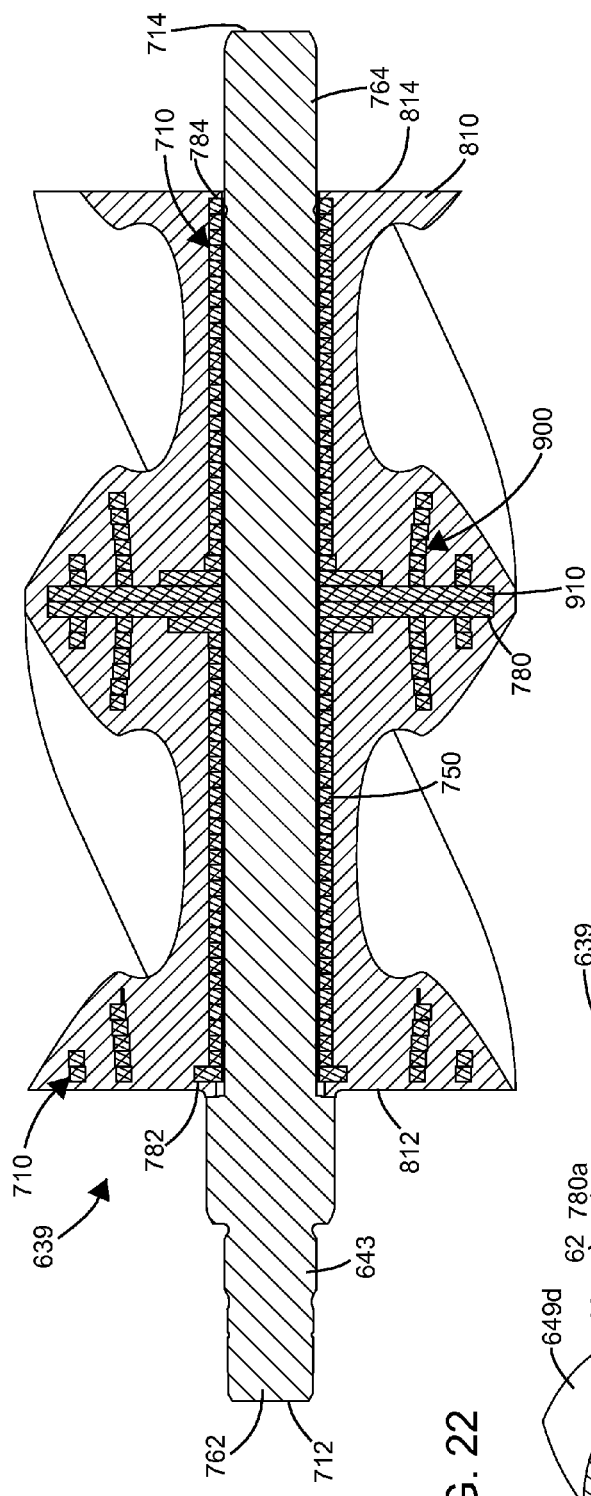
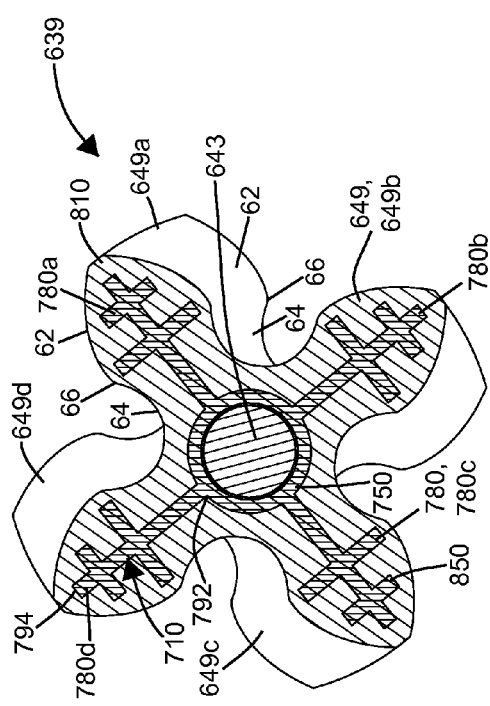

COMPOSITE SUPERCHARGER ROTORS AND METHODS OF CONSTRUCTION THEREOF

CROSS-REFERENCE TO RELATED APPLICATION

This application is a continuation of PCT/US2013/070995, filed on 20 Nov. 2013, which claims benefit of U.S. Patent Application Ser. No. 61/728,399 filed on 20 Nov. 2012, and which applications are incorporated herein by reference. To the extent appropriate, a claim of priority is made to each of the above disclosed applications.

TECHNICAL FIELD

The present invention relates to rotary compressors or blowers used to pump and/or compress gas (e.g., air).

BACKGROUND

The present invention relates to Roots-type blowers. Such Roots-type blowers have been used for supercharging internal combustion engines (e.g., Diesel cycle engines, Otto cycle engines, etc.). When used on internal combustion engines, such Roots-type blowers may be a component of a forced induction system that supplies air or an air/fuel mixture to the internal combustion engine. Such forced induction systems supply the internal combustion engine with the air or the air/fuel mixture at a higher pressure than atmospheric pressure. In contrast, naturally aspirated internal combustion engines are supplied with air or an air/fuel mixture at atmospheric pressure. By supplying pressurized air or a pressurized air/fuel mixture to the internal combustion engine, the engine is supercharged. The Roots-type blowers are known as positive displacement superchargers. Positive displacement superchargers substantially deliver a given volume of gas for every revolution of an input shaft at a given pressure and a given temperature. In contrast, certain impeller superchargers are non-positive displacement superchargers. An example Roots-style supercharger is disclosed at U.S. Pat. No. 7,866,966, assigned to the assignee of the present disclosure and incorporated herein by reference in its entirety. Another example Roots-style supercharger is disclosed at U.S. Pat. No. 4,828,467, also assigned to the assignee of the present disclosure and also incorporated herein by reference in its entirety.

SUMMARY

An aspect of the present disclosure relates to various improvements made to supercharger rotors that facilitate improved performance of superchargers. These improved supercharges may be incorporated into internal combustion engine arrangements and thereby improve performance of the internal combustion engines. Furthermore, these improved internal combustion engine arrangements may be incorporated into a motorized vehicle and thereby improve performance of the motorized vehicle. The improved performance may include increased fuel efficiency, decreased noise, decreased cost, increased reliability, increased durability, increased thermal efficiency, an increased power-to-weight ratio, an increased power-to-size ratio, decreased electrical power required, decreased accelerator lag time, etc.

Another aspect of the present disclosure relates to improvements made to the supercharger rotor that facilitates composite rotors and/or rotors with reduced rotational inertia. Reduced rotational inertia allows the supercharger rotor and thereby the supercharger to accelerate with correspondingly reduced input torque and power requirements. Reducing the input torque and the power required provides several benefits. For example, certain superchargers are powered by a clutched input shaft. A reduced input torque and power required by the supercharger allows the clutch and/or other drive components (e.g., drive belts, bearings, electric drive motors, etc.) to be reduced in size, cost, weight, etc. For a given size clutch, electric drive motor, drive belt, etc. reduced rotational inertia of the supercharger may result in increased acceleration of the supercharger and thereby reduce lag time of the supercharger to build up pressure, mass flow rate, etc.

Another aspect of the present disclosure relates to improved structural performance (e.g., increased strength, reduced deformation, improved fatigue resistance, tailoring of natural frequencies, etc.) of the supercharger rotor when compared to prior art rotors. For example, thin sections of an over-molded portion (e.g., a composite portion) of a rotor (e.g., a composite rotor) may be reinforced by various methods. In one embodiment, a reinforcing core is provided within the over-molded portion. The reinforcing core reinforces the rotor (e.g., at the thin sections) and/or carries structural loads of the rotor away from certain areas (e.g., away from the thin sections). In other embodiments, a shaft typically found within a rotor is removed thereby removing a thin section between an exterior profile of the rotor and a shaft. In particular, the composite material may extend through a center of the rotor and through an area typically occupied by the shaft. The function of the shaft may be provided by stub shafts mounted at each end of the rotor. Alternatively, a hole may be provided at one or both ends of the rotor, and a shaft or tube may engage the hole. A powered stub shaft at a first end of the rotor may have a different configuration than an idler shaft at a second end of the rotor.

Another aspect of the present disclosure relates to a supercharger rotor (i.e., a Roots-type blower rotor) that includes a core, a mounting arrangement, and a molded portion. The core includes a central portion and at least one radially extending portion. The core extends between a first end and a second end. The mounting arrangement is adapted to rotatably mount the core about the axis of rotation. The molded portion includes at least one lobe. The at least one lobe is molded over at least a portion of a corresponding one of the at least one radially extending portion of the core. The molded portion extends between a first end and a second end. A number, N, of lobes and corresponding radially extending portions of the core may include two, three, four, five, or more. In certain embodiments, the radially extending portion or portions and the lobe or lobes extend along a helical path. In certain embodiments, the helical path sweeps more than 60 degrees or at least 60 degrees around the axis of rotation as the at least one radially extending portion extends between the first end and the second end of the radially extending portion. In other embodiments, the helical path sweeps around the axis of rotation within a range of between about 90 degrees to about 160 degrees as the radially extending portion extends between the first end and the second end of the radially extending portion.

In certain embodiments, the radially extending portion includes an attachment structure that is adapted to interlock with the molded portion. In certain embodiments, the radially extended portion extends between an inner end connected to the core and an outer end and the at least one attachment structure is connected to the radially extending portion between the inner end and the outer end. In certain embodiments, the attachment structure is connected to the radially extending portion adjacent the outer end.

In certain embodiments, the lobe includes an outer portion and an inner portion, and the inner portion is positioned between the outer portion and the axis of rotation and includes a reduced section portion. In certain embodiments, the outer portion includes an epicycloidal portion, and the inner portion includes a hypocycloidal portion. Epicycloidal and hypocycloidal, as used herein, may include mathematically exact epicycloids and hypocycloids or may approximate epicycloids and hypocycloids, respectively. In certain embodiments, the radially extending portion provides tensile reinforcement across the reduced section portion when the lobes are subjected to tensile loads (e.g., centrifugal acceleration loads from high speed rotation). In certain embodiments, the attachment structure is adapted to interlock the molded portion within the outer portion of the lobe.

In certain embodiments, the molded portion substantially encapsulates the core. In certain embodiments, the molded portion encapsulates the core between the first end and the second end of the core and leaves the core exposed at the first end and the second end of the core. In other embodiments, the molded portion may completely encapsulate the core. In certain embodiments, the molded portion encircles the axis of rotation. In other embodiments, the molded portion may be segmented. In certain embodiments, the segmented portion of the molded portion may each define or partially define a lobe segment. In certain embodiments, the core includes a metallic material (e.g., aluminum, steel, titanium, etc.), and the molded portion includes a composite or a thermoplastic material (e.g., Kevlar®, fiberglass, nylon, etc.). In certain embodiments, the core is substantially made of metallic material, and the molded portion is substantially made of composite material. In certain embodiments, the core is made of extruded metallic material (e.g., extruded aluminum).

Still another aspect of the present disclosure relates to a method of making a supercharger rotor that includes providing a core and over-molding a molded portion over at least a portion of the core. In particular, the core is adapted to rotate about an axis of rotation when rotatably mounted to a housing of the supercharger, and the molded portion includes at least one lobe. In certain embodiments, the core includes at least one radially extending portion, and the over-molding of the core includes over-molding the at least one lobe over the at least one radially extending portion. In certain embodiments, the method of making the supercharger rotor further includes extruding the core with an extrusion dye. In certain embodiments, the over-molding of the core further includes extrusion over-molding of the at least one lobe over the at least one radially extending portion. In certain embodiments, extruding the core with the extrusion dye includes helical extruding. In certain embodiments, the extrusion over-molding of the at least one lobe includes helical extrusion over-molding.

Yet another aspect of the present disclosure relates to a supercharger rotor that includes a core and molded portion. The core is adapted to rotate about an axis of rotation when rotatably mounted to a housing of the supercharger. The molded portion includes at least one lobe. The at least one lobe is molded over at least a portion of the core.

Another aspect of the present disclosure relates to a supercharger rotor that includes a composite lobe arrangement and a first stub shaft arrangement. The composite lobe arrangement extends between a first end and a second end. The composite lobe arrangement includes at least one lobe. The first stub shaft arrangement is mounted to the first end of the composite lobe arrangement. The first stub shaft arrangement is adapted to rotate about an axis of rotation when rotatably mounted to a housing of the supercharger. In certain embodiments, the supercharger rotor further includes a second stub shaft arrangement that is mounted to the second end of the composite lobe arrangement. The second stub shaft arrangement is also adapted to rotate about the axis of rotation when rotatably mounted to the housing of the supercharger. In certain embodiments, the first stub shaft and/or the second stub shaft arrangement is surface mounted to the first end and/or the second end of the composite lobe arrangement, respectively (e.g., by adhesives, welding, etc.).

In certain embodiments, the stub shaft arrangements include a stub shaft and a flange. In certain embodiments, one or both of the flanges of the stub shaft arrangements are flush mounted with the ends of the composite lobe arrangement. In certain embodiments, the first stub shaft arrangement defines an outer diameter that is radially positioned nearer to the axis of rotation than an innermost portion of a working surface of the composite lobe arrangement. In other embodiments, the flange of the first stub shaft arrangement defines an outer diameter that is spaced from the axis of rotation substantially the same as the innermost portion of the working surface of the composite lobe arrangement. In still other embodiments, the flanges of the stub shaft arrangements define an outer diameter that is radially spaced from the axis of rotation substantially the same as the innermost portion of the working surface of the composite lobe arrangement. In still other embodiments, the flanges of the stub shaft arrangements define an outer diameter that is radially spaced from the axis of rotation substantially the same as an outermost portion of the working surface of the composite lobe arrangement. In still other embodiments, the flanges of the stub shaft arrangements match a profile of the composite lobe arrangement and form an extension of that profile. More than one of the stub shaft mounting configurations may be used on the same rotor and/or the same supercharger.

Still another aspect of the present disclosure relates to a method of making a supercharger rotor that includes providing a composite lobe arrangement and mounting a first stub shaft arrangement to the composite lobe arrangement. In particular, the composite lobe arrangement extends between a first end and a second end. The composite lobe arrangement includes at least one lobe. Mounting the first stub shaft arrangement to the composite lobe arrangement includes mounting the first stub shaft arrangement to the first end of the composite lobe arrangement. The first stub shaft arrangement is adapted to rotate about an axis of rotation when rotatably mounted to a housing of the supercharger. In certain embodiments, the method of making the supercharger rotor further includes mounting a second stub shaft arrangement to the second end of the composite lobe arrangement. The second stub shaft arrangement is adapted to rotate about the axis of rotation when rotatably mounted to the housing of the supercharger.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 9 is a cross-sectional end elevation view of another Roots-type blower;

FIG. 10 is a perspective view of still another rotor set adapted for use in the Roots-type blower of FIG. 1;

FIG. 11 is a perspective view of another Roots-type blower according to the principles of the present disclosure;

FIG. 12 is another perspective view of the Roots-type blower of FIG. 11;

FIG. 13 is the perspective view of FIG. 12, but exploded thereby revealing a rotor set;

FIG. 14 is the exploded perspective view of FIG. 13, but with a molded portion of a rotor of the rotor set hidden thereby revealing a core of the rotor;

FIG. 15 is an enlarged portion of FIG. 14;

FIG. 16 is a perspective view of the rotor set of FIG. 14 with the molded portion of the rotor hidden;

FIG. 17 is a perspective view of the rotor of FIG. 14;

FIG. 18 is the perspective view of FIG. 17, but with the molded portion of the rotor hidden thereby revealing the core of the rotor;

FIG. 19 is the perspective view of FIG. 18 of the core of the rotor;

FIG. 20 is a perspective view of an element of the core of the rotor of FIG. 14;

FIG. 21 is an elevation view of the element of FIG. 20;

FIG. 22 is a cross-sectional end elevation view of the rotor of FIG. 14; and

FIG. 23 is a cross-sectional longitudinal elevation view of the rotor of FIG. 14.

DETAILED DESCRIPTION

Figure 1:
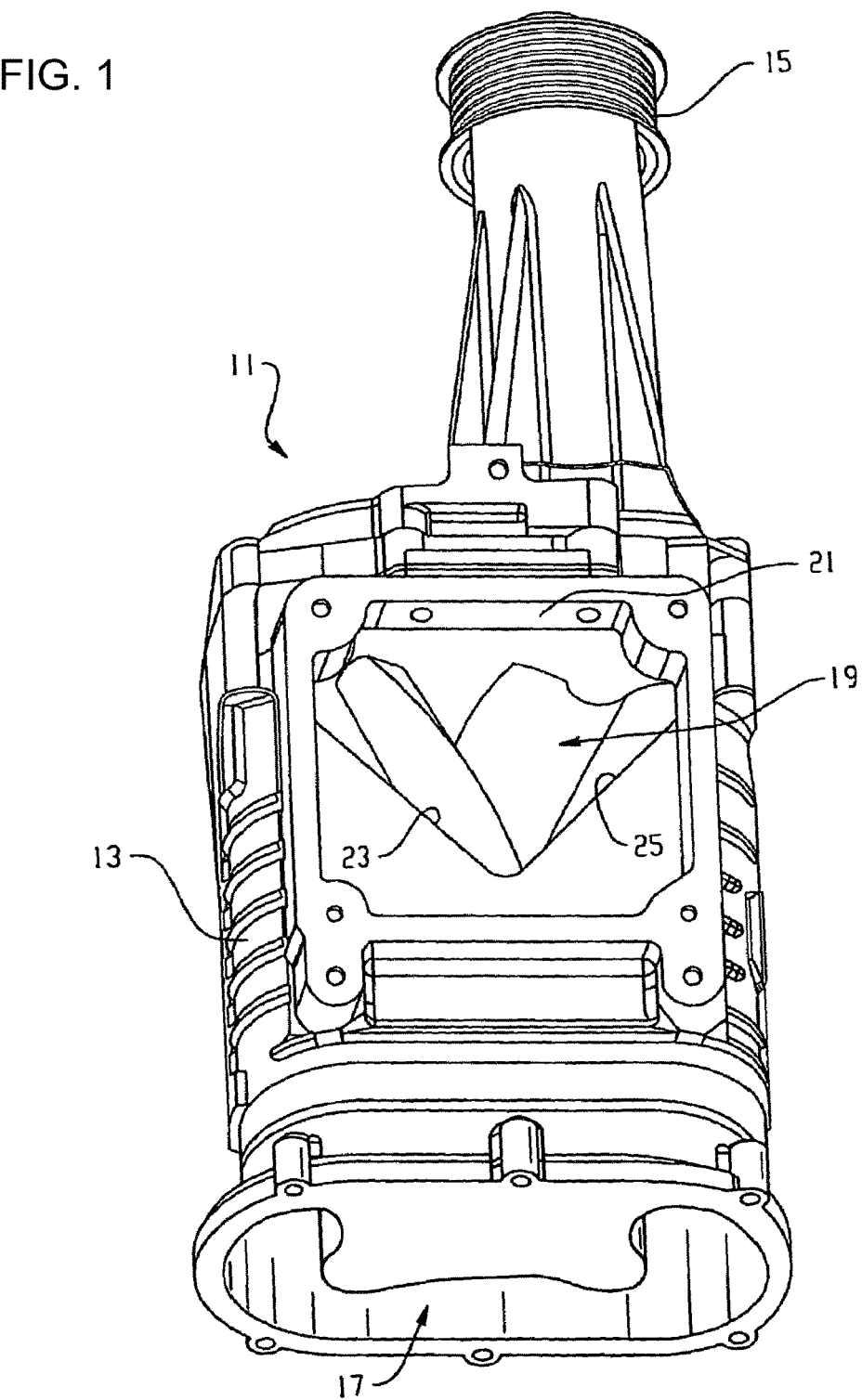
FIG. 1 is a perspective view of a Roots-type blower according to the principles of the present disclosure.

Reference will now be made in detail to example embodiments of the present disclosure. The accompanying drawings illustrate examples of the present disclosure. When possible, the same reference numbers will be used throughout the drawings to refer to the same or like parts. Since many embodiments of the invention can be made without departing from the spirit and scope of the invention, the invention resides in the claims hereinafter appended.

According to the principles of the present disclosure, improvements may be made to supercharger rotors that facilitate reduced rotational inertia (i.e., reduced mass moment of inertia) of the rotors. Reduced rotational inertia allows the supercharger rotor and thereby the supercharger to accelerate with correspondingly reduced input torque and power requirements. Reducing the input torque and/or the power required provides several benefits. For example, certain superchargers are powered by a clutched input shaft. A reduced input torque and/or a reduced input power required by the supercharger allows the clutch and/or other drive components (e.g., drive belts, bearings, electric drive motors, etc.) to be reduced in size, cost, weight, etc. For a given size clutch, electric drive motor, drive belt, etc., reduced rotational inertia of the supercharger may result in increased acceleration of the supercharger and thereby reduce lag time of the supercharger to build up pressure, mass flow rate, etc. Furthermore, the benefits of reducing the rotational inertia of the rotor may include both reduced input torque and increased rotor acceleration, thereby reducing the requirements on the drive components and increasing the acceleration of the supercharger.

In certain internal combustion engine arrangements, a supercharger is clutched thereby allowing the engine arrangement to be run both with the supercharger engaged and running and also to be run with the supercharger disconnected and idle. By clutching the supercharger, the engine arrangement can be run in different configurations to best match different load conditions that the engine arrangement may be operated in. In still other engine arrangements, the supercharger may be powered by a variable speed device (e.g., a variable speed electric motor, a variable speed belt system, etc.). In such engine arrangements, it may be desired to minimize rotational inertia of the rotors of the supercharger. By minimizing the rotational inertia of the supercharger, the acceleration rate of the supercharger can be increased for a given clutch, a given electric motor, etc. Furthermore, smaller drive components for the supercharger may be used, and, in cases where the supercharger rotor is directly connected to a crankshaft of the internal combustion engine, lowered rotational inertia of the supercharger results in less torque required of the crankshaft to accelerate the supercharger and thereby allows more torque from the crankshaft to go towards accelerating the vehicle, etc.

In an example application, a clutch spins-up a supercharger from a standstill to 14,000 RPM in 0.20 second in response to a demand from a controller for supercharging of an engine. Assuming constant acceleration (e.g., constant input torque), certain parameters of the supercharger are given below.

$V_{0.0}$=0 RPM=0 rad/s $V_{0.2}$=14,000 RPM=1,466 radians/s $A=dv/dt=(14{,}000-0)\text{ RPM}/0.2\ s=70{,}000\text{ RPM}/s=7{,}330\text{ radians}/s^2$ Where $V_{0.0}$ is the initial rotational velocity, $V_{0.2}$ is the rotational velocity at a time of 0.2 seconds, and $A$ is the constant acceleration.

Certain example prior art supercharger rotors may have example rotational inertias that range from about $4\times10^{-4}$ to about $5\times10^{-3}$ kg·m². By reducing the example rotational inertias in half, to about $2\times10^{-4}$ to about $2.5\times10^{-3}$ kg·m², the input torque, used to accelerate the rotor, could be reduced by half or the spin-up time could be reduced, approaching half of the former spin-up time. Alternatively, the input torque and the former spin-up time could both be reduced.

The reduction in the rotational inertia may, for example, be accomplished by replacing a rotor, primarily made of aluminum, with a composite rotor, according to the principles of the present disclosure. Such improvement may be made to retrofit an existing design and may be applied to a new design. Such improvement may be applied to rotors with 1 lobe, 2 lobes, 3 lobes, 4 lobes, 5 lobes, 6 lobes, and more than 6 lobes. Such improvement may be applied to rotors with helical twist and to straight rotors with no helical twist.

According to the principles of the present disclosure, improvements may be made to supercharger rotors that facilitate structural improvements. The structural improvements may facilitate improvements in a profile, P, of a working surface of the rotor. The term "working surface" of the rotor, as used herein, is the surface of the rotor that interfaces with a working surface of the opposite rotor and thereby pumps gas through the supercharger. The structural improvements may facilitate optimizing a shape of the profile, P, of the working surface (e.g., allow more helical twist, allow deeper undercuts, etc.) and/or may facilitate increasing a number, N, of the rotor lobes.

For example, U.S. Pat. No. 7,866,966 discloses a Roots-type blower with increased thermodynamic efficiency when compared to other Roots-type blowers, known in the art. In particular, U.S. Pat. No. 7,866,966 discloses rotors with four lobes and a twist angle of 120 degrees. In contrast, a Roots-type blower disclosed at U.S. Pat. No. 4,828,467 illustrates rotors with three lobes. Certain prior art Roots-type blowers include a twist angle of 60 degrees. Other prior art Roots-type blowers include a twist angle of 0 degrees (i.e., no twist angle). As mentioned at U.S. Pat. No. 7,866,966, certain prior art Roots-style blower rotors utilize a 60 degree twist angle on the lobes because, at the time, a 60 degree twist angle was the largest twist angle a lobe hobbing cutter could accommodate. By increasing the number, N, of the lobes per rotor, increasing the twist angle, $\alpha$, various improvements in performance can be achieved. In particular, noise levels may be reduced, higher pressure ratios may be produced, and/or higher thermodynamic efficiencies may result. In addition, further tailoring of the profile, P, of the lobes of the rotors may further increase performance in terms of noise, pressure ratio, thermodynamic efficiency, etc.

Figure 2:
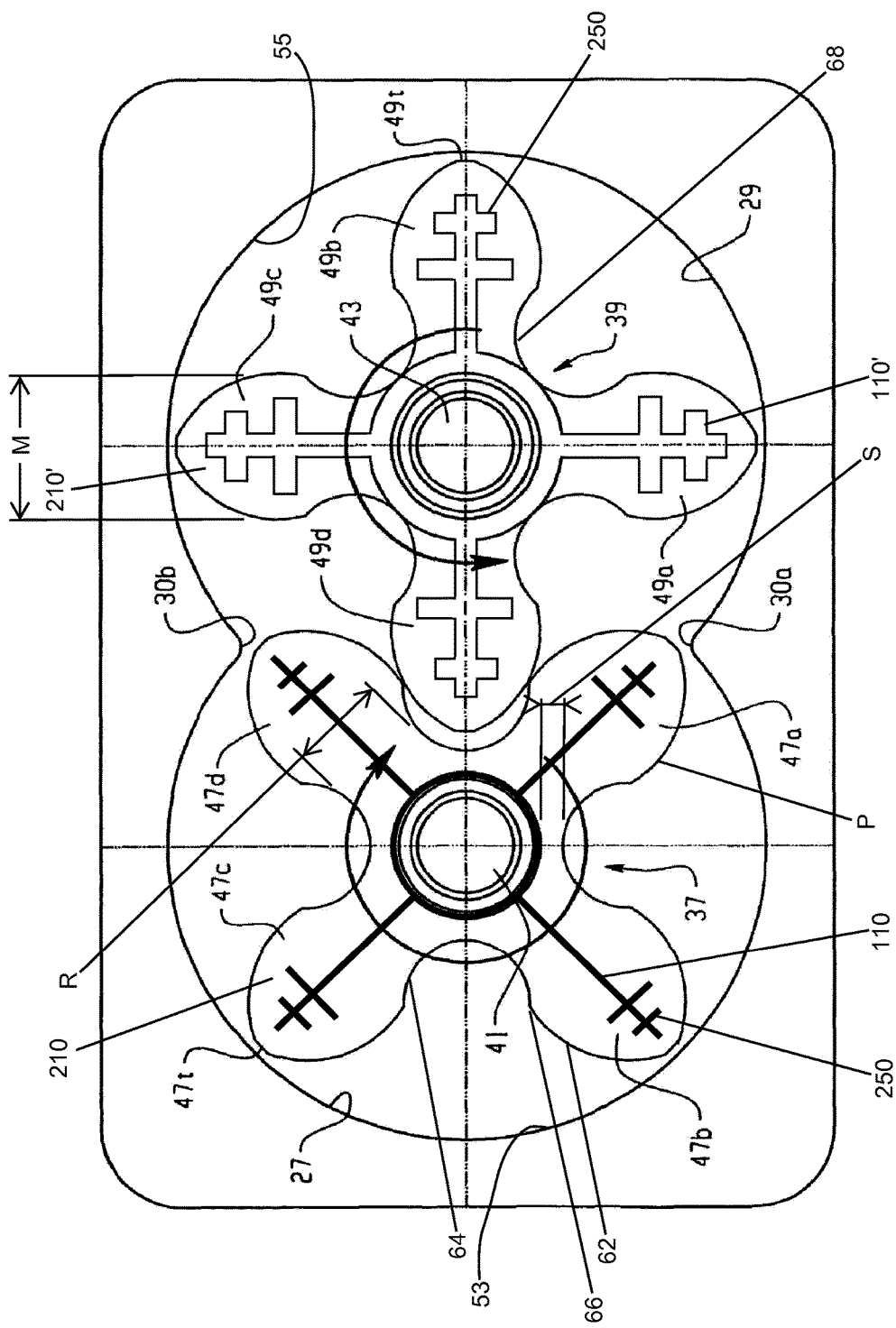
FIG. 2 is a semi-schematic end view of the Roots-type blower of FIG. 1 with an end cap and a pulley removed.

However, as illustrated at FIGS. 2 and 9, increasing the number, N, of the lobes 47, 49, 347, 349 on the rotor 37, 39, 337, 339, increasing the twist angle $\alpha$, $\alpha'$, and/or optimizing the profile, P, P', of the lobes 47, 49, 347, 349 of the rotor 37, 39, 337, 339 may result in a reduced minimum cross-section, R, of a base of the lobe 47, 49 (e.g., relative to a widest portion, M, of the lobe 47, 49). Increasing the number, N, of the lobes 47, 49, 347, 349 on the rotor 37, 39, 337, 339, increasing the twist angle $\alpha$, $\alpha'$, and/or optimizing the profile, P, P', of the lobes 47, 49, 347, 349 of the rotor 37, 39, 337, 339 may result in a reduced minimum thickness, S, between the profile, P, of the rotor 37, 39, 337, 339 and a shaft 41, 43, 641, 643 of the rotor 37, 39, 337, 339. The structural improvements, according to the principles of the present disclosure, may facilitate increasing the number, N, of the lobes 47, 49, 347, 349, 647, 649 on the rotor 37, 39, 337, 339, 637, 639; increasing the twist angle $\alpha$, $\alpha'$; and/or optimizing the profile, P, P', of the lobes 47, 49, 347, 349, 647, 649 of the rotor 37, 39, 337, 339, 637, 639. The structural improvements may thereby facilitate performance improvements, mentioned above, of the supercharger.

According to the principles of the present disclosure, improvements may be made to supercharger rotors that facilitate strength improvements. As it is typically desired to operate such Roots-style blowers at high rotational operating speeds (e.g., 15,000 to 18,000 RPM or 12,000 to 15,000 RPM) substantial centrifugal acceleration results in high tensile loads along the lobes 47, 49, 347, 349, 647, 649 as the lobes 47, 49, 347, 349, 647, 649 extend radially outward. As it may be desired to operate such Roots-style blowers at high rotational accelerations (e.g., 13,000 to 16,000 radians per second squared or greater than 14,000 radians per second squared or greater than 20,000 radians per second squared) substantial tangential acceleration may result in high bending loads across the lobes 47, 49, 347, 349, 647, 649. Furthermore, such centrifugal acceleration, such tangential acceleration, and/or other loads may result in high stresses and/or high strains at various locations of the rotor 37, 39, 337, 339, 637, 639 (e.g., at the minimum cross-section, R, R', of the base of the lobe 47, 49, 347, 349, 647, 649, at the minimum thickness, S, S', between the profile, P, P', of the rotor 37, 39, 337, 339, 637, 639 and the shaft 41, 43, 341, 343, 641, 643, etc.). Such high stresses and/or high strains may result in structural, strength, and/or deformation concerns. For example, the deformation concerns may include elongation concerns for the lobes 47, 49, 347, 349, 647, 649. As it is desired for clearances between tips 47t, 49t, 647t, 649t of the lobes 47, 49, 347, 349, 647, 649 to run as close as practical to overlapping cylindrical chambers 27, 29, 327, 329 of a housing 13, 313, 613 of the Roots-style blower to reduce air leakage across the tips 47t, 49t, 647t, 649t, it is desired to minimize elongation of the lobes 47, 49, 347, 349, 647, 649.

According to the principles of the present disclosure, improvements may be made to supercharger rotors that facilitate creep improvements. In particular, high operating temperatures combined with the high tensile stress from rotation may cause a plastic/composite rotor without an underlying support to creep. This permanent radial deformation can cause contact with the housing or the opposing rotor which is detrimental to the operation of the supercharger.

According to the principles of the present disclosure, improvements may be made to supercharger rotors that facilitate geometric improvements. The structural improvements may facilitate the reduction or elimination of the minimum thickness, S, S', and thereby allow an improved and/or optimized profile, P, of a working surface of the rotor, may facilitate an increase in the number, N, of the lobes, may facilitate an increase in twist, etc. The geometric and structural improvements may co-enable each other.

Turning now to FIGS. 1-7, a supercharger (i.e., a Roots-type blower) 11 is illustrated according to the principles of the present disclosure.

Turning also to FIGS. 11-16, a supercharger (i.e., a Roots-type blower) 611 is illustrated according to the principles of the present disclosure. In certain embodiments, the supercharger 11, 611 is adapted to mount to an internal combustion engine, and thereby pump air or an air/fuel mixture into the internal combustion engine. By such supercharging of an internal combustion engine, power output of the internal combustion engine may be increased. Alternatively, a displacement of the internal combustion engine may be reduced when the supercharger 11, 611 is mated thereto. By including a supercharged engine in a vehicle, a smaller displacement engine may provide equivalent performance compared to that of a naturally aspirated internal combustion engine of a larger displacement. By using the supercharged engine of the smaller displacement, engine size and/or engine weight of the vehicle may be reduced. In certain embodiments, the supercharger 11, 611 may be activated and deactivated by a clutch and/or an electric motor. When high power is required of the internal combustion engine, the supercharger 11, 611 may be activated and thereby deliver pressurized air or a pressurized air/fuel mixture to the internal combustion engine thereby substantially increasing the power output of the internal combustion engine. Such high power may be required when accelerating the vehicle (e.g., when passing, when accelerating from a stop light, when auxiliary hydraulic circuits are activated, when climbing hills, etc.). When, for example, cruising on a level road, the power required of the internal combustion engine may be substantially reduced. When the internal combustion engine is only required to produce low power, the supercharger 11, 611 may be deactivated. The internal combustion engine, running with a deactivated supercharger, may consume substantially less fuel than an equivalent larger displacement internal combustion engine with substantially the same low-power load.

As illustrated at FIGS. 1 and 12, the supercharger 11, 611 includes an inlet 17, 617 and an outlet 19, 619. The inlet 17, 617 may draw in fresh air or an air/fuel mixture at atmospheric pressure or at below atmospheric pressure. Upon the supercharger 11, 611 being activated, the air or the air/fuel mixture is pumped to the outlet port 19, 619. As uncompressed volumetric flow through the supercharger 11, 611 may exceed uncompressed volumetric flow through combustion chambers of the internal combustion engine, the air or the air/fuel mixture may become compressed and increase in pressure and/or in temperature. In certain embodiments, heat exchangers (e.g., coolers, intercoolers, etc.) are provided in and/or with the supercharger 11, 611 (e.g., at the outlet port 19, 619 of the supercharger 11, 611) to reduce the temperature of the air or air/fuel mixture.

The outlet port 19, 619 of the supercharger 11, 611 may be adapted to connect to an intake manifold of the internal combustion engine. In the depicted embodiment, the outlet port 19, 619 includes an end surface 21, 621 that is substantially perpendicular to a longitudinal axis of the supercharger 11, 611. The outlet port 19, 619 further includes a side surface 23, 623 and a side surface 25, 625. Input power may be supplied to the supercharger 11, 611 by a pulley 15. Alternatively, input power may be supplied to the supercharger 11, 611 by an electric motor or other power means.

In the depicted embodiment, the pulley 15 is connected to an input shaft that drives a pair of gears, 615 (see FIG. 11). The input shaft and the pair of gears 615 thereby drive a first rotor 37, 637 and a second rotor 39, 639 in opposite rotational directions. As depicted, the pair of gears 615 is arranged such that the pair of rotors 37, 39, 637, 639 run at the same rotational velocity. In addition, the pair of gears 615 times each of the rotors 37, 39, 637, 639 such that a set of lobes 47, 647 of the rotor 37, 637 meshes with a set of lobes 49, 649 of the second rotor 39, 639. In the embodiments depicted at FIGS. 2, 3, and 11-14, the first rotor 37, 637 includes four lobes 47a, 47b, 47c, 47d, 647a, 647b, 647c, 647d, and the second rotor 39, 639 includes four lobes 49a, 49b, 49c, 49d, 649a, 649b, 649c, 649d. As the rotors 37, 39, 637, 639 rotate and the lobes 47, 49, 647, 649 intermesh, air is pumped from the inlet port 17, 617 to the outlet port 19, 619 of the supercharger 11, 611. The air or the air/fuel mixture is prevented from leaking around end surfaces 47s1, 47s2 of the first rotor 37, 637 by a seal and/or a close clearance between the end surfaces 47s1, 47s2 and the housing 13, 613 of the supercharger 11, 611. Likewise, the air or the air/fuel mixture is kept from leaking around end surfaces 49s1, 49s2 by a seal or close clearance between the end surfaces 49s1, 49s2 and the housing 13, 613 of the supercharger 11, 611.

The housing 13, 613 of the supercharger 11, 611 further includes a pair of overlapping cylindrical chambers 27, 29 that respectively include a pair of cylindrical surfaces 53, 55 that meet each other at an inlet cusp 30a and at an outlet cusp 30b. When the lobes 47, 49, 647, 649 intermesh with each other, they also substantially seal with each other to prevent the gas (e.g., the air or the air/fuel mixture) from leaking backwards between the higher pressure outlet port 19, 619 and the lower pressure inlet port 17, 617. The lobes 47, 49, 647, 649 each include a respective tip 47t, 49t, 647t, 649t. The tips 47t, 647t effectively seal against the cylindrical surface 53 of the cylindrical chamber 27 when in close proximity to the cylindrical surface 53. Likewise, the tips 49t, 649t effectively seal with the cylindrical surface 55 of the cylindrical chamber 29 when in close proximity to the cylindrical surface 55. FIG. 9 illustrates an example of how similar cylindrical surfaces 353, 355 intersect with an outlet port 319. FIG. 13 illustrates an embodiment of the housing 613 that includes a main housing 613A and an end cap portion 613B.

Figure 3:
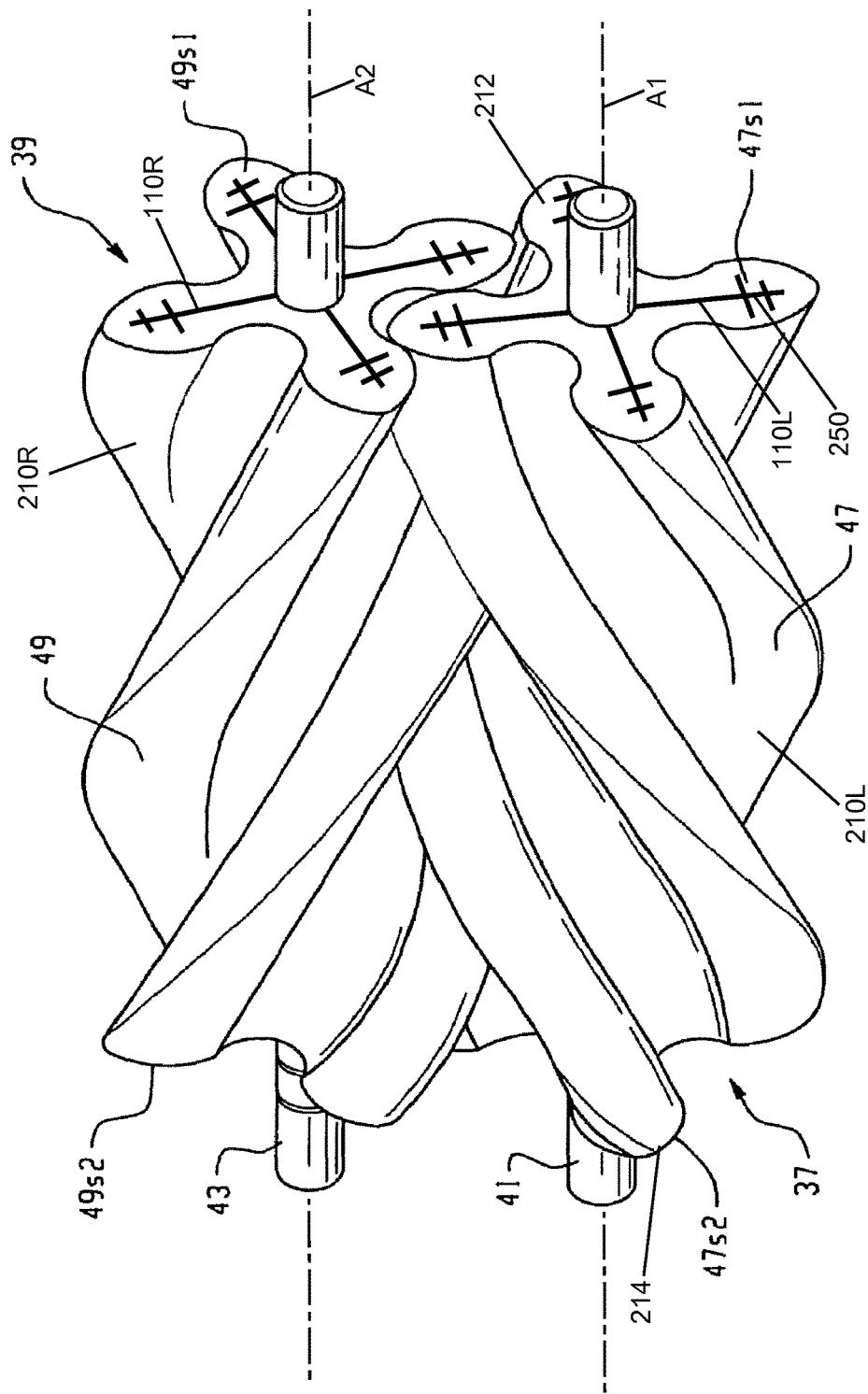
FIG. 3 is a perspective view of a rotor set of the Roots-type blower of FIG. 1.
Figure 4:
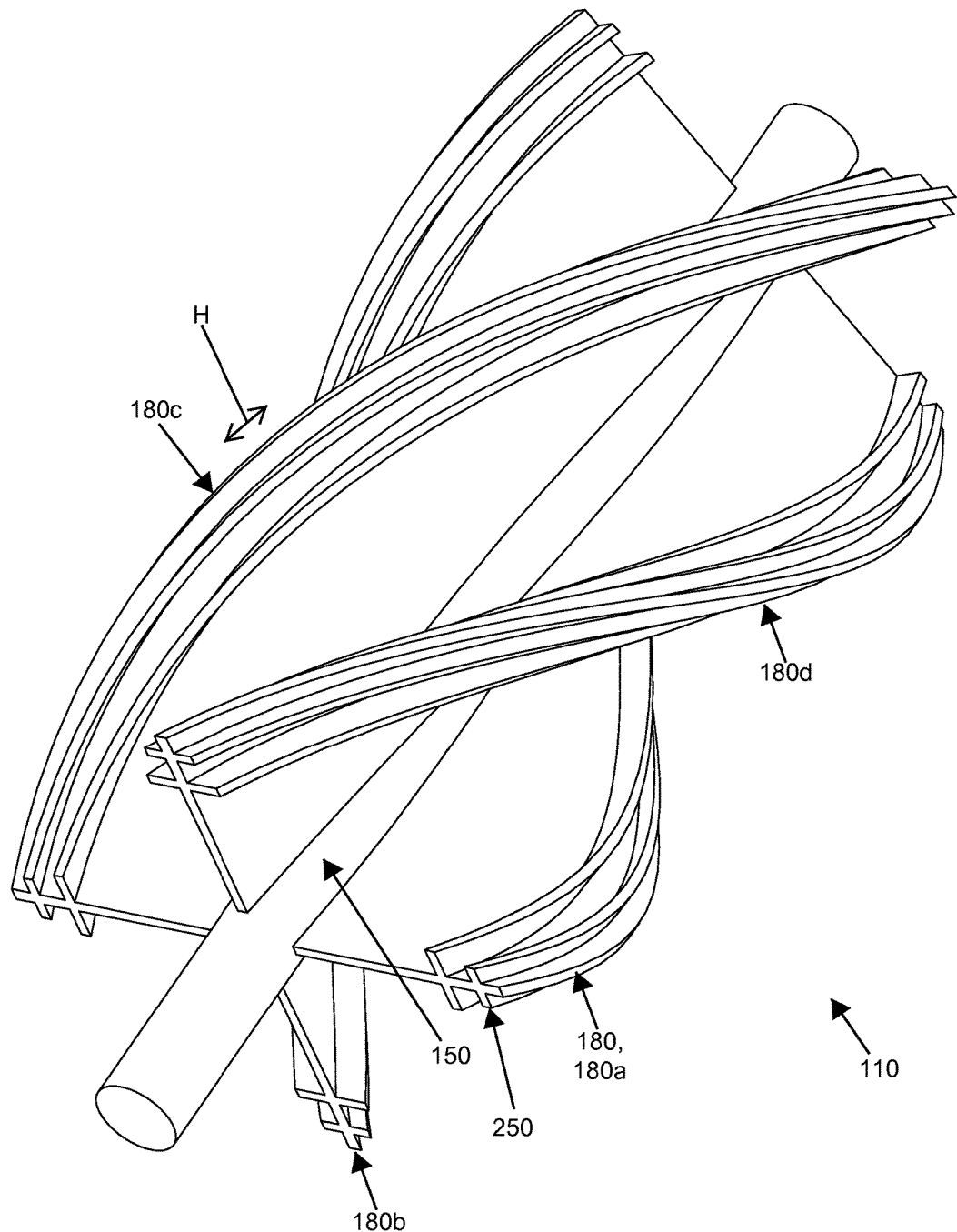
FIG. 4 is a perspective view of a core of a rotor of the rotor set of FIG. 3.

As illustrated at FIGS. 3, 13, and 16, the rotors 37, 39, 637, 639 include a twist between the first end surfaces 47s1, 49s1 and the second end surfaces 47s2, 49s2. In the depicted embodiment, the twist is a helical twist that sweeps about a respective axis A1, A2 over a sweep angle α. In certain embodiments, the lobe or lobes 47, 49, 647, 649 extend along a helical path H (see FIGS. 4, 17, and 18). In the depicted embodiment, the rotor 37, 637 includes a left-hand twist, and the rotor 39, 639 includes a right-hand twist. In the embodiments depicted at FIGS. 3 and 16, the sweep angle α is 160 degrees.

The profile, P, of the rotors 37, 39, 637, 639 is developed such that a close intermeshing of the rotors 37, 39, 637, 639 occurs as they continuously meet each other near a center of the supercharger 11, 611. In the depicted embodiments, the profile, P, is developed with a distinct outer portion 62 and a distinct inner portion 64 that meet each other at a cusp 66 on each side of each of the lobes 47, 49, 647, 649. In certain embodiments, the outer portion 62 may be developed as an epicycloidal-like geometry, and the inner portion 64 may be developed as a hypocycloidal-like geometry. As illustrated at FIGS. 2 and 9, typically, the maximum section, M, M' (e.g., a maximum transverse thickness), of each of the lobes 47, 49, 647, 649 is found at the outer portion 62. Conversely, the minimum section, R (e.g., a minimum transverse thickness), of the lobes 47, 49, 647, 649 is typically found at the inner portion 64. The profile, P, of the rotors 37, 39, 637, 639 therefore results in the minimum section, R, being located nearer to the axis A1, A2 than the maximum section, M, thus placing a greater centrifugal load per unit area and/or a greater tangential load per unit area (e.g., bending stress, shear stress, and/or tensile stress) on the reduced section, R.

According to the principles of the present disclosure, a core 110, 710 is provided within each of the rotors 37, 39, 637, 639. In the depicted embodiment, the rotors 37, 39, 637, 639 are twisted, and therefore the core 110, 710 of the rotor 37, 637 is a left-hand core 110L, 710L. Likewise, the rotor 39, 639 includes a right-hand core 110R, 710R. The cores 110L, 110R, 710L, 710R substantially include the same sweep angle α as their respective rotors 37, 39, 637, 639. As depicted, the core 110, 710 includes a central portion 150, 750, a first shaft portion 162, 762, and a second shaft portion 164, 164. The core 110, 710 extends between a first end 112, 712, adjacent the first shaft portion 162, 762, and a second end 114, 714 adjacent the second shaft portion 164, 764. The central portion 150, 750 includes one or more radially extending portions 180, 780. As depicted, four radially extending portions 180a, 180b, 180c, 180d, 780a, 780b, 780c, 780d are included and equally spaced about the axis A1, A2. The radially extending portions 180, 780 generally extend between a first end 182, 782 and a second end 184, 784. The first end 182, 782 is adjacent the first end 112, 712 of the core 110, 710, and the second end 184, 784 is adjacent the second end 114, 714 of the core 110, 710. In certain embodiments, the radially extending portion or portions and the lobe or lobes extend along the helical path H (see FIGS. 4, 17, and 18). The radially extending portions 180, 780 extend between an inner end 192, 792 and an outer end 194, 794. As depicted, the inner end 192, 792 is connected to the central portion 150, 750 and the outer end 194, 794 is spaced radially outwardly from the inner end 192, 792.

As depicted at FIGS. 4-7, the core 110 may be formed as an extrusion. In certain embodiments, the extrusion is a metal extrusion. In certain embodiments, the extrusion may be an aluminum extrusion. The extrusion may be a helical extrusion.

As depicted at FIGS. 14-16 and 18-23, the core 710 may be formed from a stack 900 of sheets 910. In certain embodiments, the sheet 910 is a metal sheet (e.g., sheet metal). In certain embodiments, the sheet 910 may be an aluminum sheet. In certain embodiments, the sheet 910 may be a stamped sheet. The sheets 910 may be stacked rotationally offset from each other thereby forming the stack 900 as a helical stack 900H (see FIG. 19). In certain embodiments, the sheets 910 may be joined to each other when formed into the stack 900. The sheets 910 may include interlocking features that join the sheets 910 to each other. The sheets 910 may be press-fit onto the shaft 643 and thereby be joined to each other.

The sheets 910 may be welded to each other. The sheets 910 may be soldered to each other. The sheets 910 may be brazed to each other. The sheets 910 may be fastened to each other. The sheets 910 may be bonded to each other. The sheets 910 may be over-molded and thereby be joined to each other. The sheets 910 may include a hole 920 for the shafts 641, 643. The sheets 910 may join at the hole 920 to the shafts 641, 643.

As depicted, the sheets 910 are substantially a two dimensional extrusion. In the depicted embodiment, the sheets 910 have a thickness of about 2 millimeters. In other embodiments, the thickness of the sheets 910 may range from about 1 millimeter to about 5 millimeters. In still other embodiments, the sheets 910 may have other thicknesses.

As depicted, the sheets 910 stack directly on each other. In other embodiments, the sheets 910 may be spaced from each other. The over-molding material may fill the space between the sheets 910. As depicted, the sheets 910 are substantially the same. In other embodiments, the sheets 910 may be different from each other and/or may form spaces and/or pockets with each other. The over-molding material may fill the spaces and/or the pockets formed by the sheets 910.

As depicted, the sheets 910 are substantially planer. In other embodiments, the sheets 910 may be formed in three dimensions. For example, interlocking tabs may be formed on the sheets 910 for attachment to neighboring sheets 910. As another example, by curving the sheets 910, spaces may be formed between adjacent sheets 910. The over-molding material may fill such spaces between the sheets 910.

Figure 7:
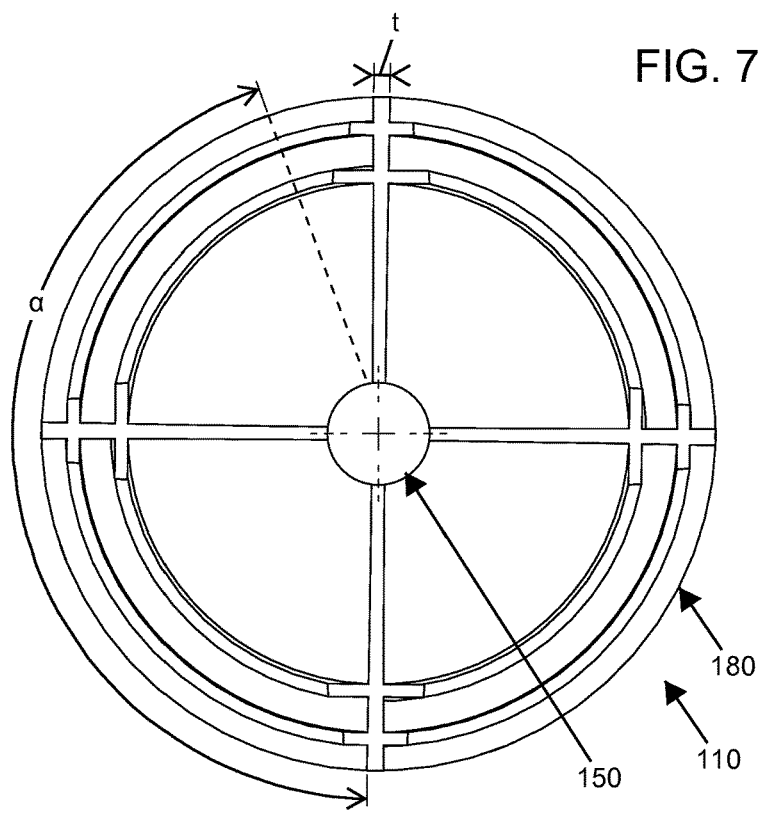
FIG. 7 is an end elevation view of the core of FIG. 4.
Figure 6:
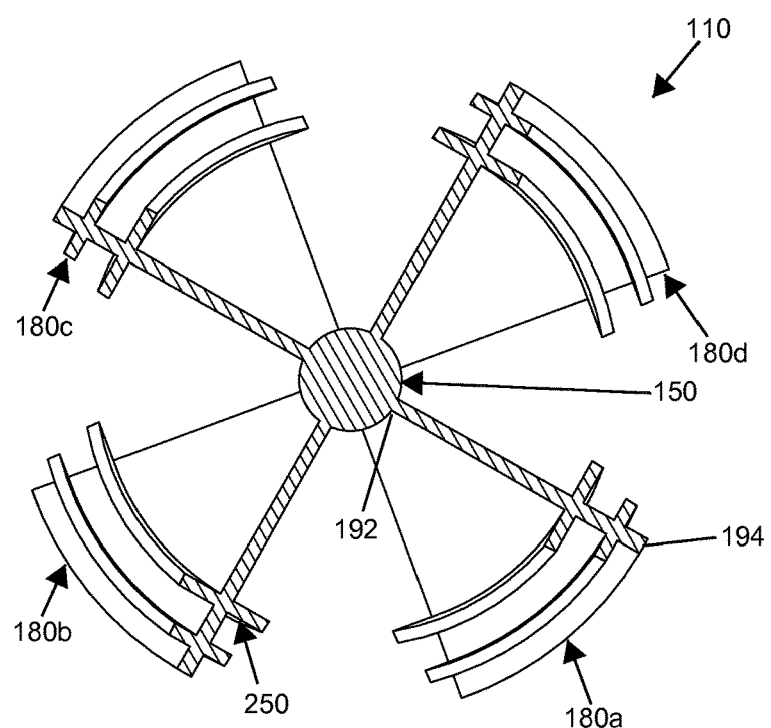
FIG. 6 is a cross-sectional end elevation view of the core of FIG. 4, as called out at FIG. 5.

An attachment structure 250, 850 is included on the core 110, 710. As depicted, each of the radially extending portions 180, 780 includes the attachment structure 250, 850. As depicted, the attachment structure 250, 850 is located at or adjacent to the outer end 194, 974. The attachment structure 250, 850 may extend between the first end 182, 782 and the second end 184, 784 of the radially extending portions 180, 780. As depicted, the first end 182, 782 and the second end 184, 784 are spaced from each other by a length L. As semi-schematically illustrated at FIG. 2, the core 110, 710 may have varying proportions with respect to the rotors 37, 39, 637, 639. As illustrated at FIGS. 7 and 22, the radially extending portions 180, 780 of the core 110, 710 may be defined by a thickness t. As illustrated, the thickness t is a constant thickness. In other embodiments, the thickness t may vary. As illustrated, the radially extending portions 180, 780 are continuous in the radial direction. In other embodiments, the radially extending portions 180, 780 may be perforated, may include holes, may include discrete and disconnected segments, may include barbs, etc. As depicted, the attachment structure 250, 850 generally coincides with the outer portion 62 of the lobes 47, 49, 647, 649. In other embodiments, the attachment structure 250, 850 may include other various forms. As depicted, the attachment structure 250, 850 includes an interlocking form 930 with a shape of the double dagger typographical symbol, ‡ (see FIG. 21). In particular, a radial segment 932 extends radially and is part of the radially extending portions 180, 780. The radial segment 932 is intersected with a first cross-segment 934 and a second cross-segment 936. The first cross-segment 934 and the second cross-segment 936 are generally perpendicular to the radial segment 932 in the depicted embodiment. The first cross-segment 934 is longer than the second cross-segment 936 in the depicted embodiment.

The core 110, 710 is adapted to provide radial strength, stiffness, and creep resistance to the lobes 47, 49, 647, 649 of the rotors 37, 39, 637, 639. The cores 110, 710 are adapted to reinforce the rotors 37, 39, 637, 639. The radially extending portion 180, 780 of the core 110, 710 may be adapted to reinforce a minimum thickness, S (see FIG. 2), between a root 68 of the profile P and a shaft hole of the shaft 41, 43, 641, 643. The radially extending portion 180, 780 of the core 110, 710 may be adapted to reinforce the reduced section, R, of the rotors 37, 39, 637, 639.

Figure 5:
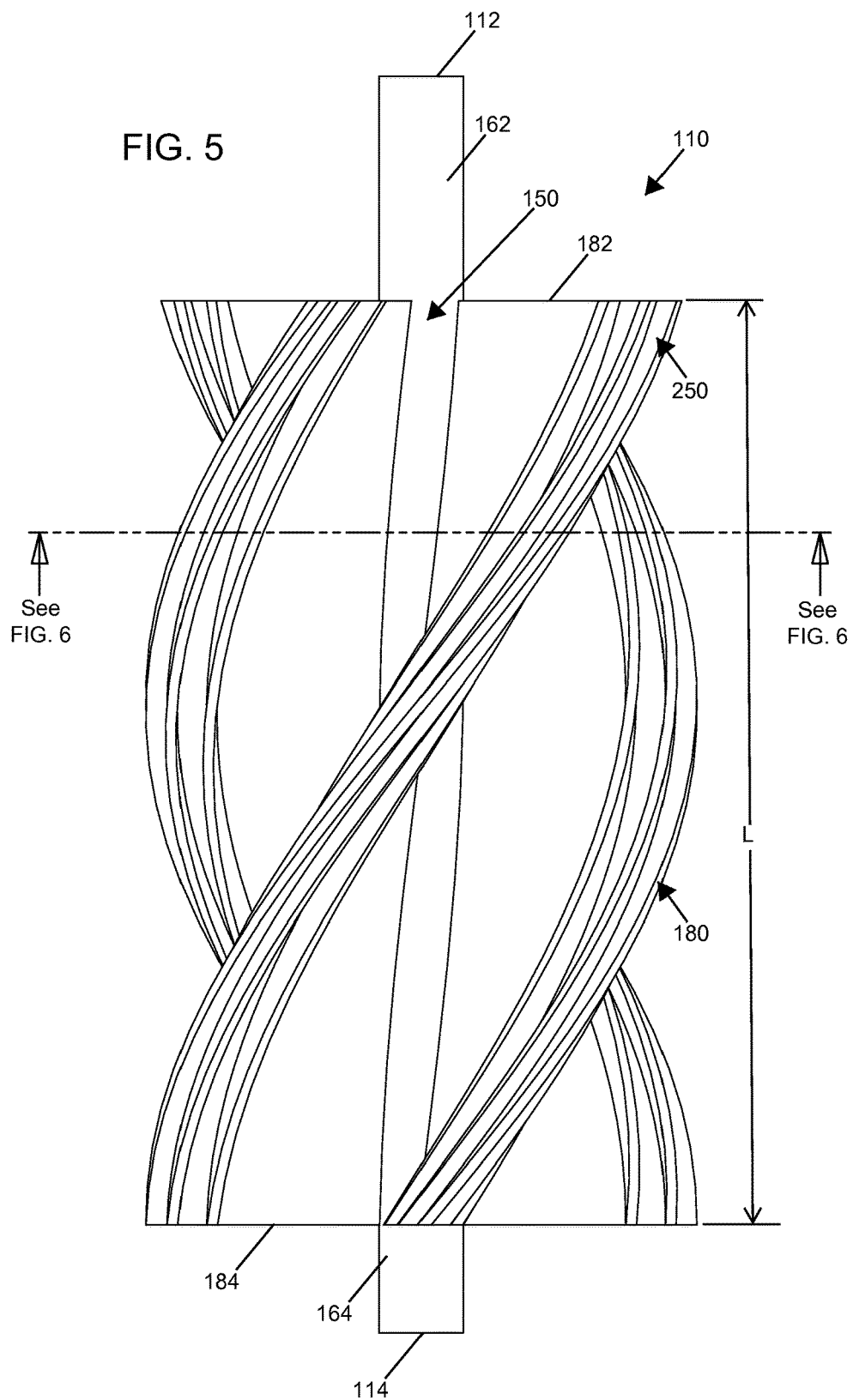
FIG. 5 is a top plan view of the core of FIG. 4.

As depicted at FIGS. 3 and 5, the first end 182 of the radially extending portion 180 extends to the first end surface 47s1, 49s1. Likewise, the second end 184 of the radially extending portion 180 extends to the second end surface 47s2, 49s2. In other embodiments, such as an embodiment of a supercharger 311, depicted at FIG. 9, and the embodiment of the supercharger 611, depicted at FIGS. 13 and 23, the radially extending portion 180, 780 stops short of end surfaces of lobes 347, 349, 647, 649.

As illustrated at FIGS. 2, 3, 22, and 23, the rotors 37, 39, 637, 639 each include a molded portion 210, 210', 810 that is molded over a respective one of the cores 110, 710. As the rotors 37, 39, 637, 639 twist, the molded portion 210, 210', 810 correspondingly twists. In particular, the rotor 37, 637 includes a left-hand twisted molded portion 210L, 810L. Likewise, the rotor 39, 639 includes a right-hand twisted molded portion 210R, 810R. The molded portions 210, 210', 810 extend between a first end 212, 812 and a second end 214, 814. As depicted, the first end 212, 812 coincides with the first end surfaces 47s1, 49s1 of the lobe 47, 647. Likewise, the second end 214, 814 coincides with the second end surfaces 47s2, 49s2.

The molded portion 210, 210', 810 may be injection molded over the core 110, 710. In other embodiments, the molded portion 210, 210', 810 is extrusion molded over the core 110, 710. In other embodiments, the molded portion 210, 210', 810 is laid up over the core 110, 710. The molded portion may be made of plastic, thermal plastic, thermal setting plastic, nylon, carbon fiber, fiberglass, and/or other materials known in the art of molding, injection molding, extrusion molding, etc. The molded portion 210, 210', 810 may be molded to a finished profile P. Alternatively, some or all of the molded portion 210, 210', 810 may be finished machined to a finished profile P. The molded portion 210, 210', 810 may interlock with the radially extending portion 180, 780. The molded portion 210, 210', 810 may interlock with the attachment structure 250, 850. The interlocking of the attachment structure 250, 850 and the molded portion 810 may provide radial attachment support between the core 710 and the molded portion 810. The molded portion 210, 210', 810 may partially encapsulate the radially extending portion 180, 780. Alternatively, the molded portion 210, 210', 810 may fully encapsulate the radially extending portion 180, 780.

In embodiments where the stack 900 is the helical stack 900H, a series of steps 940 may be formed from one of the sheets 910 to another of the sheets 910 (see FIG. 19). The series of the steps 940 may interlock with the molded portion 810. The interlocking of the steps 940 and the molded portion 810 may provide axial attachment support between the core 710 and the molded portion 810.

Figure 8:
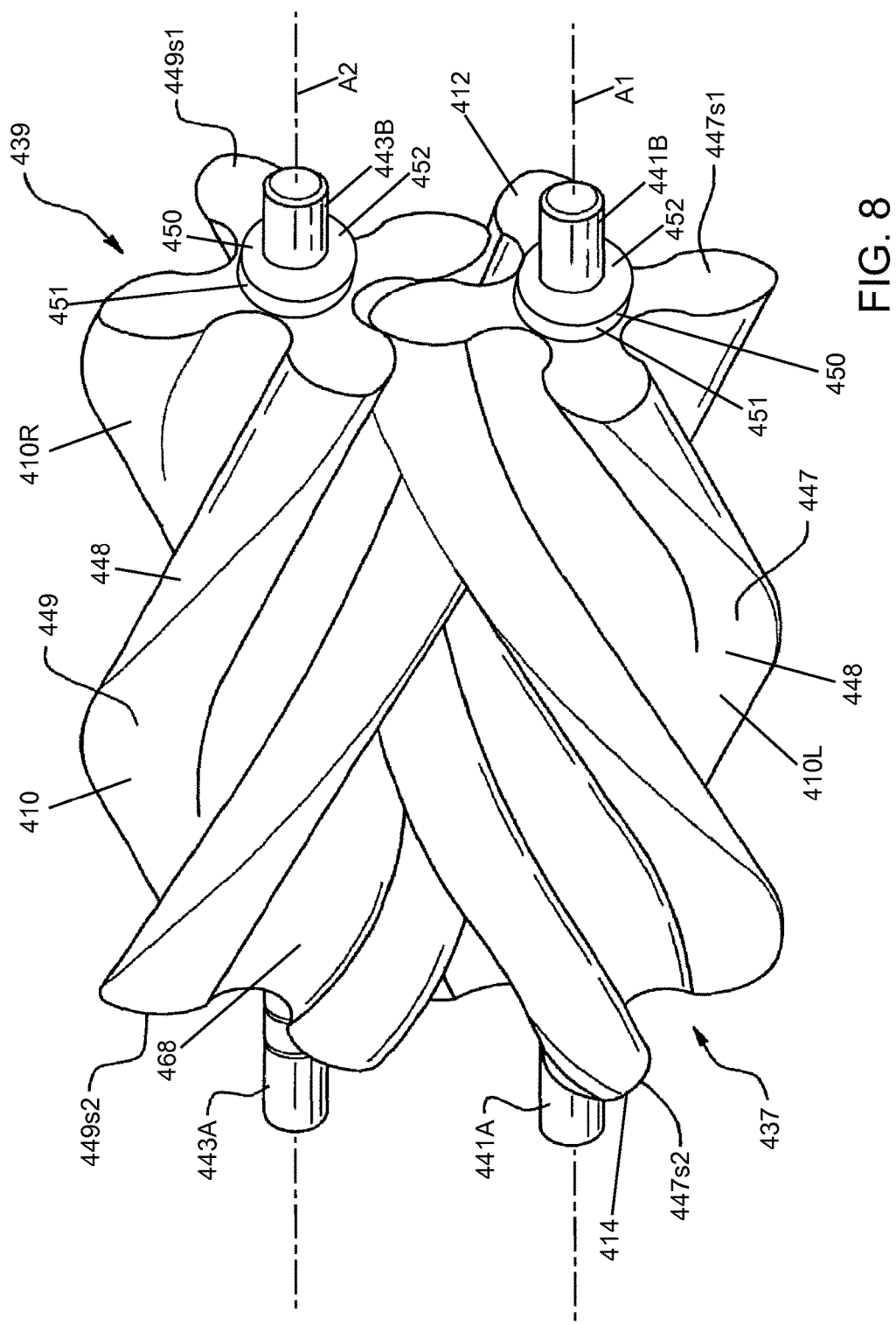
FIG. 8 is a perspective view of another rotor set adapted for use in the Roots-type blower of FIG. 1.

Turning now to FIG. 8, a pair of rotors 437, 439, according to the principles of the present disclosure are illustrated. The rotors 437, 439 may be adapted to be installed within the housing 13, 613 of the supercharger 11, 611. The rotor 437 includes a set of four lobes 447, and the rotor 439 includes a set of four lobes 449. In other embodiments, the rotor 437, 439 may include more than four lobes 447, 449. In other embodiments, the rotor 437, 439 may include fewer than four lobes 447, 449. The lobes 447, 449 are generally similar to the lobes 47, 49, described above. The lobes 447, 449 extend between a first end 412 and a second end 414.

Unlike conventional rotors of conventional superchargers, the rotors 437, 439 do not include a central hole that encloses a shaft. Instead, the rotors 437, 439 may be formed of a central lobed portion 448 that extends between ends surfaces 447s1, 449s1 and end surfaces 447s2, 449s2. By not including the shaft hole, no thin section (e.g., S, S', illustrated at FIGS. 2 and 9, respectively) is formed between a bottom of a root 468 between adjacent lobes 447, 449 and a shaft hole. Instead, a center of the rotors 437, 439 can be filled and continuous throughout the central lobed portion 448.

The central lobed portion 448 may be made of a composite or a thermoplastic material (e.g., Kevlar®, fiberglass, nylon, etc.). The central lobed portion 448 may include a molded portion 410. The central lobed portion 448 may substantially be a single molded piece 410. In certain embodiments, the method of making the supercharger rotor 437, 439 further includes extruding the central lobed portion 448 with an extrusion dye. In certain embodiments, the central lobed portion 448 is made by extrusion molding. In certain embodiments, extruding the central lobed portion 448 with the extrusion dye includes helical extruding. The molded portion 410 may be a right-hand molded portion 410R or a left-hand molded portion 410L. In certain embodiments, the extrusion molding of the central lobed portion 448 includes helical extrusion over-molding. The central lobed portion 448 may be injection molded. In other embodiments, the central lobed portion 448 may be extrusion molded over a core (e.g., the core 110, the core 710, etc.). In other embodiments, the central lobed portion 448 may be laid-up. The central lobed portion 448 may be made of plastic, thermal plastic, thermal setting plastic, nylon, carbon fiber, fiberglass, and/or other materials known in the art of molding, injection molding, extrusion molding, etc. The central lobed portion 448 may be molded to a finished profile P. Alternatively, some or all of the central lobed portion 448 may be finished machined to a finished profile P.

A first shaft portion 441A (e.g., a stub shaft) may be mounted to the end surface 447s2. Likewise, a second shaft portion 441B may be mounted to the end surface 447s 1. Likewise, a first shaft portion 443A may be mounted to end surface 449s2, and a second shaft portion 443B may be mounted to the end surface 449s1. Various methods and means may be used to connect the shaft portions 441A, 441B, 443A, 443B and their respective end surfaces 447s1, 447s2, 449s1, 449s2. The methods may include adhesives, welding, fasteners, interlocking molding, etc.

The first shaft portion 441A (e.g., the stub shaft) may be mounted to the end 182, 782. Likewise, the second shaft portion 441B may be mounted to the end 184, 784. Likewise, a first shaft portion 443A may be mounted to the end 182, 782, and a second shaft portion 443B may be mounted to the end 184, 784. Various methods and means may be used to connect the shaft portions 441A, 441B, 443A, 443B and the respective ends 182, 184, 782, 784. The methods may include adhesives, welding, fasteners, interlocking molding, etc.

The shaft portions 441A, 441B, 443A, 443B may each include a flange 450. The flange 450 may include an outer perimeter 451 and a face 452, generally perpendicular to the shaft portion. The shaft portions 441A, 441B, 443A, 443B may generally fit and function in an interchangeable way with the rotor shafts 41, 43, 641, 643.

As depicted, the perimeter 451 may be cylindrical and extend radially up to the root 468 between the adjacent lobes 447, 449. In certain embodiments, the flange 450 may be flush with the end surfaces 447s1, 447s2, 449s1, 449s2 or the ends 182, 184, 782, 784. In certain embodiments, the flange 450 may be counter-sunk and/or counter-bored into the end surfaces 447s1, 447s2, 449s1, 449s2. In certain embodiments, the flange 450 may connect to the ends 182, 184, 782, 784. In certain embodiments, the outer perimeter 451 may generally include the profile, P, of the rotor 437, 439. The flange 450 thereby may be an extension of the lobes 447, 449. The flange 450 may thereby cover a respective one of the end surfaces 447s1, 447s2, 449s1, 449s2. In certain embodiments, the flange 450 of one of the rotors 437, 439 may extend to an outer diameter defined by the corresponding rotor tips. In certain embodiments, the flange 450 may be cylindrical with an outer diameter corresponding to the outer diameter defined by the corresponding rotor tips.

Turning now to FIG. 10, a pair of rotors 437, 539, according to the principles of the present disclosure is illustrated. The rotors 437, 539 may be adapted to be installed within the housing 13 613 of the supercharger 11, 611. The rotor 437 is discussed in detail above. The rotor 539 is discussed in detail below. FIG. 10 illustrates that various styles of rotors 437, 539 may be used together in the supercharger 11, 611. Alternatively, two rotors of the same style (e.g., the style of the rotor 539) may be used together. Like the rotor 439, the rotor 539 includes a set of four lobes 549. In other embodiments, the rotor 539 may include more than four lobes 549. In other embodiments, the rotor 539 may include fewer than four lobes 549. The lobes 549 are generally similar to the lobes 47, 49, 647, 649, described above. The lobes 447, 549 extend between a first end 412 and a second end 414.

As with the rotors 437, 439, 637, 639, the rotor 539 may not necessarily include a central hole that encloses a shaft. Instead, the rotor 539 may be formed of a central lobed portion 548 that extends between ends surface 549s1 and end surface 549s2. As with the rotors 437, 439, by not including the shaft hole, no thin section (e.g., S, S', illustrated at FIGS. 2 and 9, respectively) is formed between a bottom of a root 468 between adjacent lobes 549 and a shaft hole. Instead, a center of the rotor 539 can be filled and continuous throughout the central lobed portion 548.

As depicted, the rotor 539 includes a flange 550 at each end 412, 414. Each of the flanges 550 may include a face 552 that may define the ends 412, 414, respectively. In certain embodiments, only one flange 550 is used at one of the ends 412 or 414. The flange or flanges 550 may include an outer perimeter 551 with the profile, P, of the rotor 539. The flanges 550 thereby may be extensions of the central lobed portion 548 and further define the lobes 549. The flanges 550 may thereby cover a respective one of the end surfaces 549$s$1, 549$s$2. In embodiments with lobes 540 that include a helical twist, the outer perimeter 551 may include a helical twist that may match the helical twist of the central lobed portion 548.

A first shaft portion 543A (e.g., a stub shaft) may extend from the face 552. Likewise, a second shaft portion 543B may extend from the opposite face 552. The first shaft portion 543A may be mounted or otherwise joined to the face 552 and/or the flange 550, and the second shaft portion 543B may be mounted or otherwise joined to the face 552 and/or the flange 550. Various methods and means may be used to connect the shaft portions 543A, 543B and their respective end surfaces 549$s$1, 549$s$2 via the flange 550. The methods may include adhesives, welding, fasteners, interlocking molding, etc. The face 552 may be generally perpendicular to the shaft portion 543A, 543B. The shaft portions 543A, 543B may generally fit and function in an interchangeable way with the rotor shafts 41, 43, 641, 643.

Features and/or components disclosed herein may be mixed and matched to form additional embodiments. For example, the core 110, illustrated at FIG. 5, may be incorporated with the flange or flanges 550, illustrated at FIG. 10.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A rotor for a supercharger device, the rotor comprising:
an axis of rotation;
a core including a central portion and at least one radially extending portion, the core extending between a first end and a second end, wherein the core includes an attachment structure having a first cross-segment and a second cross-segment that is shorter than the first cross-segment, wherein the first and second cross-segments extend away from the at least one radially extending portion, wherein the at least one radially extending portion extends between an inner end connected to the core and an outer end, and wherein the attachment structure is connected to the at least one radially extending portion between the inner end and the outer end, wherein the outer end extends radially beyond the attachment structure first and second cross-segments; and
a molded portion including at least one lobe, the at least one lobe molded over at least a portion of a corresponding one of the at least one radially extending portion of the core, the molded portion extending between a first end and a second end, wherein the at least one lobe includes an outer portion molded over the first and second cross-segments and includes an inner portion, wherein the inner portion is positioned between the outer portion and the axis of rotation, and wherein the inner portion includes a reduced section portion, wherein the first cross-segment is located within a first part of the lobe outer portion and the second cross-segment being located within a second part of the lobe outer portion that is narrower than the first part, wherein the outer end of the at least one radially extending portion extends into a third part of the lobe outer portion that is narrower than the second part.

2. The rotor of claim 1, wherein the central portion of the core includes a driven first shaft portion adjacent the first end of the core and a second shaft portion adjacent the second end of the core.

3. The rotor of claim 2, wherein the at least one radially extending portion extends between a first end and a second end, wherein the first end of the core extends beyond the first end of the radially extending portion, and wherein the second end of the core extends beyond the second end of the radially extending portion.

4. The rotor of claim 1, wherein the at least one radially extending portion and the at least one lobe extend along a helical path.

5. The rotor of claim 4, wherein the core includes stacked sheets.

6. The rotor of claim 1, wherein the inner portion includes a hypocycloidal portion and the outer portion includes an epicycloidal portion.

7. The rotor of claim 1, wherein the radially extending portion provides tensile reinforcement across the reduced section portion when the at least one lobe is subjected to a tensile load.

8. The rotor of claim 1, wherein the core includes a metallic material and the molded portion includes a composite material.

9. The rotor of claim 1, further comprising:
a first stub shaft arrangement mounted to the first end of the molded portion, the first stub shaft arrangement adapted to rotate about an axis of rotation when rotatably mounted to a housing of the supercharger device.

10. The rotor of claim 9, further comprising a second stub shaft arrangement mounted to the second end of the molded portion, the second stub shaft arrangement also adapted to rotate about the axis of rotation when rotatably mounted to the housing of the supercharger device.

11. The rotor of claim 9, wherein the first stub shaft arrangement is surface mounted to the first end of the molded portion.

12. The rotor of claim 9, wherein the first stub shaft arrangement includes a stub shaft and a flange.

13. The rotor of claim 12, wherein the flange of the first stub shaft arrangement is flush mounted with or surface mounted to the first end of the molded portion.

14. The rotor of claim 12, wherein the flange of the first stub shaft arrangement defines an outer surface including a profile and wherein the profile of the flange matches a profile of the composite lobe arrangement.

15. The rotor of claim 14, wherein the profiles of the flange and the composite lobe arrangement are twisted about the axis of rotation.

16. A composite rotor for a supercharger device, the rotor comprising:
a core adapted to rotate about an axis of rotation when rotatably mounted within a housing of the supercharger device, the core being formed from a plurality of stacked sheets, wherein each of the plurality of sheets includes a plurality of radially extending portions; and
a molded portion including a plurality of lobes, wherein each of the plurality of lobes is molded over corresponding ones of the plurality of radially extending portions of each of the plurality of stacked sheets, the molded portion securing the plurality of stacked sheets together;

wherein each of the plurality of radially extending portions includes an attachment structure having a first cross-segment and a second cross-segment that is shorter than the first cross-segment, and wherein each of the radially extending portions extends between an inner end connected to the core and an outer end and wherein the attachment structure is connected to the at least one radially extending portion between the inner end and the outer end with the outer end extending beyond the attachment structure, and wherein each of the plurality of lobes includes an outer portion molded over the first and second cross-segments and includes an inner portion, wherein the inner portion is positioned between the outer portion and the axis of rotation, and wherein the inner portion includes a reduced section portion, wherein the first cross-segment is located within a first part of the lobe outer portion and the second cross-segment being located within a second part of the lobe outer portion that is narrower than the first part, wherein the outer end of the at least one radially extending portion extends into a third part of the lobe outer portion that is narrower than the second part.

17. The composite rotor of claim 16, wherein the stacked sheets are rotationally offset from each other to form a helical stack.

18. The composite rotor of claim 17, further comprising:
a shaft extending through the molded portion and the core, wherein each of the sheets is provided with a central opening for receiving the shaft.

19. The composite rotor of claim 17, wherein each of the plurality radially extending portions includes at least one attachment structure adapted to interlock with the molded portion.

20. The composite rotor of claim 16, wherein the plurality of stacked sheets are welded together such that welds and the molded portion together secure the plurality of stacked sheets together.

* * * * *